United States Patent Office 2,943,822
Patented July 5, 1960

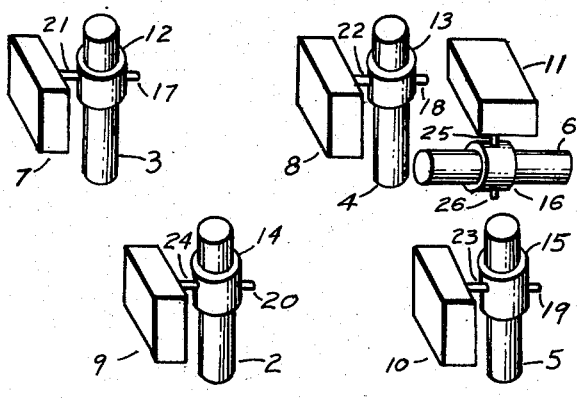
July 5, 1960 S. HAMILTON 2,943,822
AIRCRAFT CONTROL BY THRUST PRODUCERS
Filed April 22, 1953 6 Sheets-Sheet 1
INVENTOR.
Sanborn Hamilton
BY July 5, 1960
S. HAMILTON
2,943,822
AIRCRAFT CONTROL BY THRUST PRODUCERS
Filed April 22, 1953
6 Sheets-Sheet 2
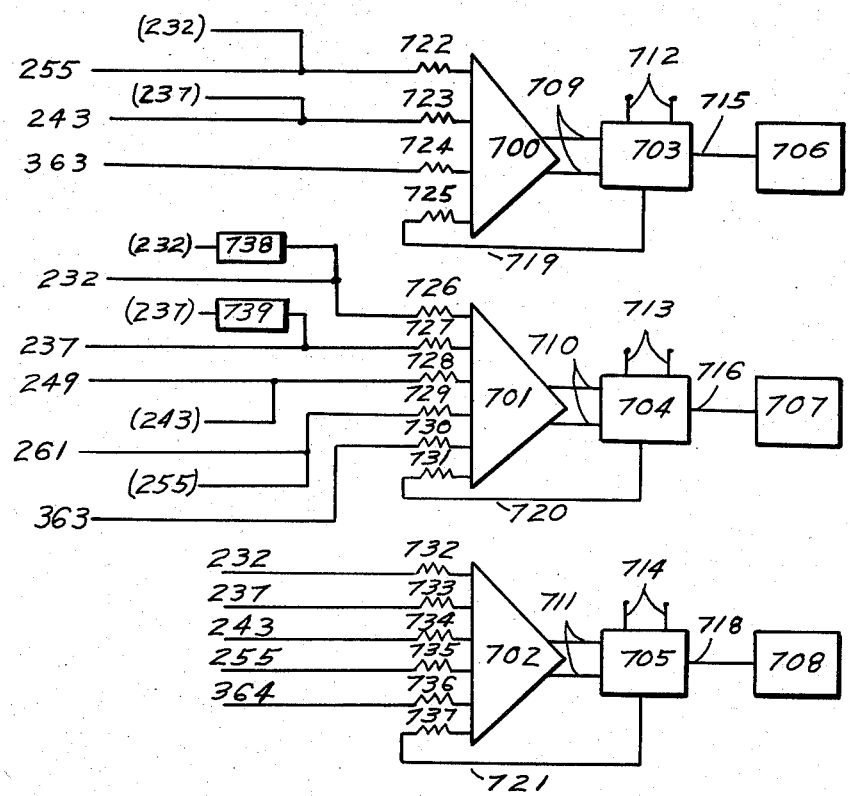
FIG 11
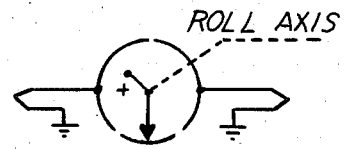
ROLL AXIS
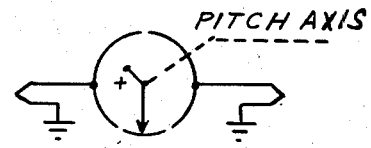
PITCH AXIS
FIG 3
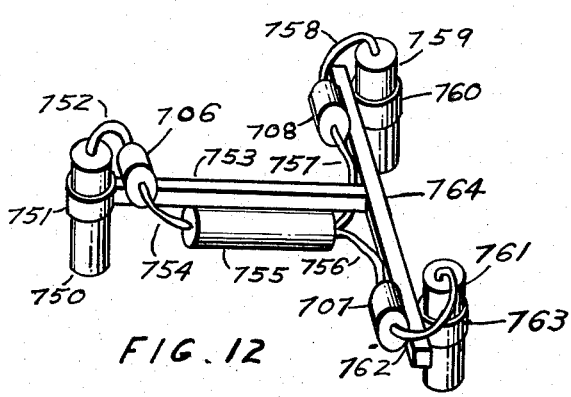
FIG. 12
INVENTOR.
Sanlom Hamilton
BY

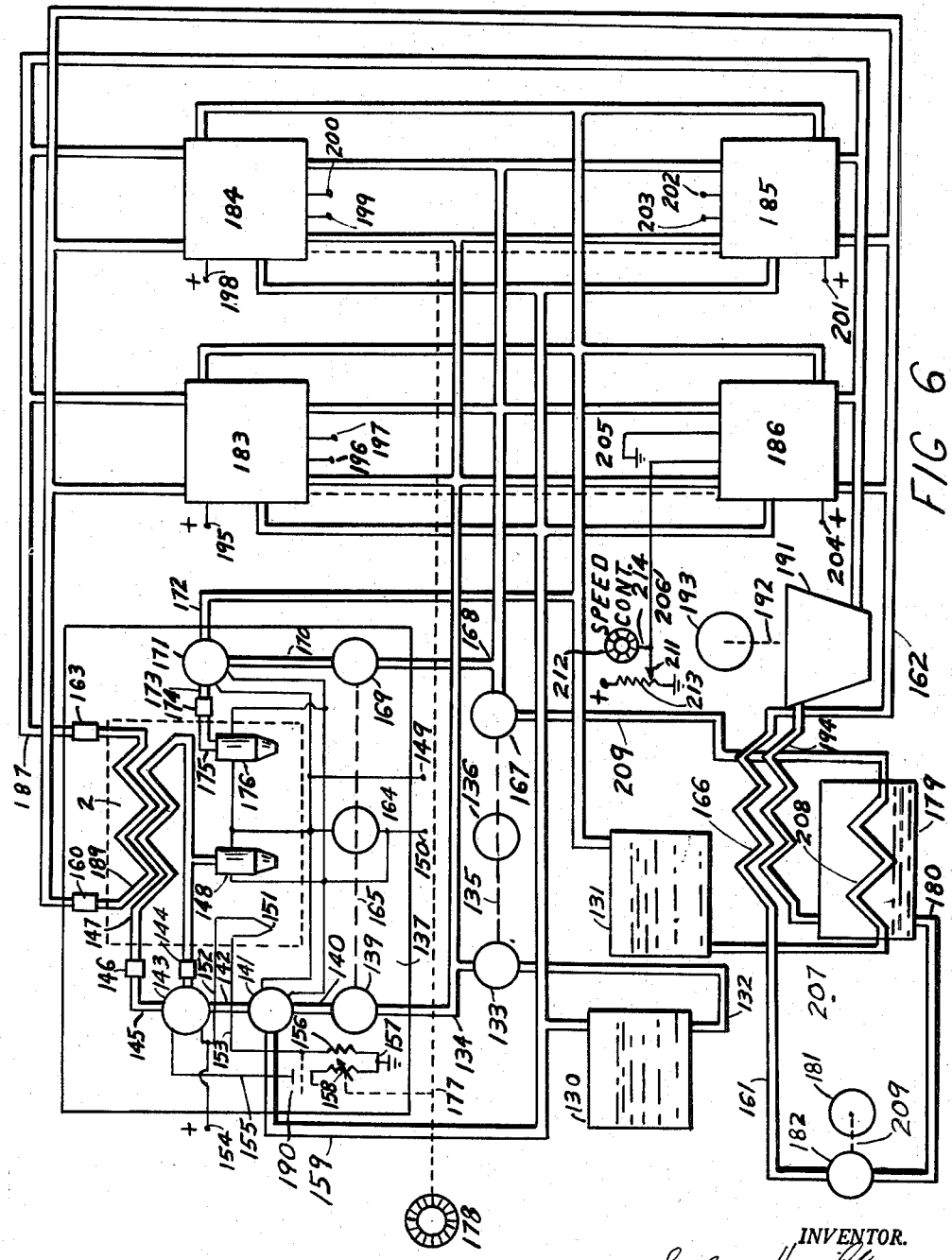

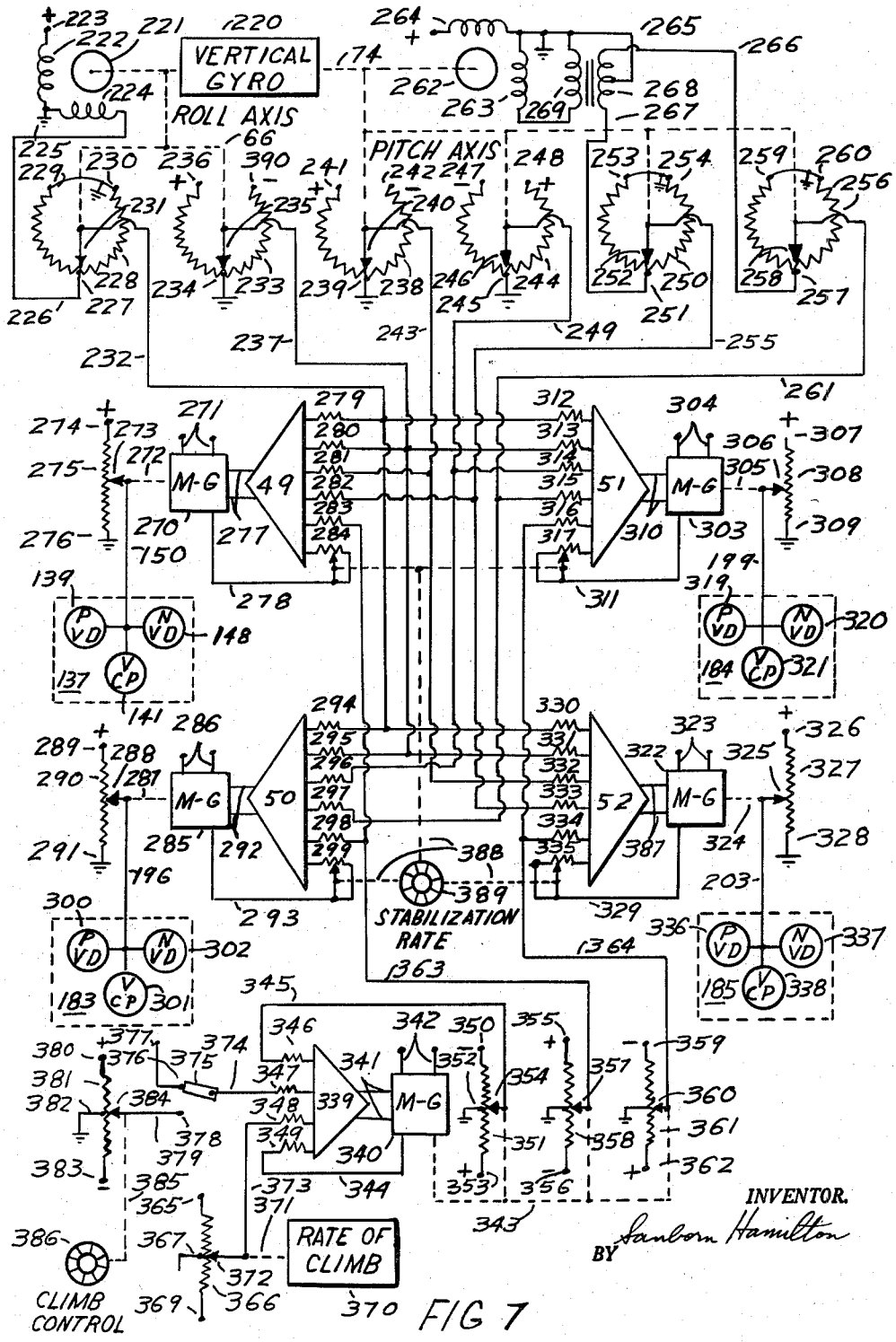

2,943,822

AIRCRAFT CONTROL BY THRUST PRODUCERS

Sanborn Hamilton, Sunnyvale, Calif.
(22 W. 58th St., Kansas City, Mo.)

Filed Apr. 22, 1953, Ser. No. 350,378

34 Claims. (Cl. 244—77)

This invention pertains to a flight system for a vehicle in space.

An object of this invention is to provide a flight system for vehicles which need not be constructed with regard to airfoil lift or requiring protruding movable propulsion apparatus.

According to the invention the vehicle is suspended by the vertical thrust produced by propulsion units placed at appropriate positions to offset the force of gravity. Sustainment of the vehicle at a balanced position with respect to the earth's horizontal plane requires control of thrust of individual vertical propulsion units with respect to displacement and rate of displacement about roll and pitch axis, and vertical displacement of the vehicle. The interdependence of the thrust of each vertical propulsion unit is also considered.

Conventional aircraft control systems utilize control signals with respect to controlling control surfaces with respect to only one axis. A vehicle suspended by vertical thrust produced by downward force of propulsion units placed at desirable locations for suspending the device with respect to the earth, requires a control system in which the magnitude of thrust of each vertical propulsion unit depends upon both longitudinal and lateral axis rotations.

By the term "thrust generating unit" as used herein is meant a device which is capable of operation to generate a thrust suitable for driving or supporting an aircraft and is not dependent on translatory movement of the aircraft with respect to the surrounding atmosphere. The term therefore excludes such aircraft control and lifting airfoils as elevators, ailerons, elevons, slats, slabs, brakes, etc. The thrust generating units may operate by reaction in the manner of rocket motors.

According to this invention, there is provided control equipment for a flight vehicle, comprising a plurality of vertical-thrust generating units distributed about the center of gravity of the vehicle, the magnitude of thrust of each such unit depending upon both longitudinal and lateral axis rotations so that each unit produces rotation of the vehicle about both roll and pitch axies; thrust control means for each vertical-thrust generating unit; vehicle stability sensing means responsive to displacement of the vehicle about the roll and pitch axes; the stability sensing means producing signals the magnitude of which are proportional to deviation from the roll and pitch reference angles; and computer means responsive to the signals for determining a proportional thrust change of the thrust control means to control the thrust of each of the vertical-thrust generating units to stabilize the vehicle about both roll and pitch axes.

In one embodiment of the invention the vertical propulsion units are placed in positions in which the thrust of each propulsion unit has an equal control of rotation about both roll and pitch axis of the vehicle.

In a second embodiment of the invention the vertical propulsion units are placed in positions in which the thrust of each propulsion unit is predominantly about either a roll or pitch axis. The magnitude of thrust of the propulsion units associated with a particular axis of rotation is determined by the relative magnitude of thrust of the propulsion units associated with the other axis of rotation.

In a third embodiment of the invention three vertical propulsion units are placed in positions for sustaining stability.

A further object of this invention is to provide a control system for stabilizing the vehicle in space with reference to the earth's horizontal plane.

A further object of this invention is to provide a control system for control of the direction of flight for this class of vehicle.

A further object of this invention is to provide a means of variation of vertical thrust in proportion to change of horizontal speed to reduce change of altitude.

A further object of this invention is to provide a traffic control system for sustaining the vehicle at a particular heading determined by desired heading and altitude.

A further object of this invention is to provide the forces necessary for this manner of flight.

A further object of this invention is to provide a means of controlling the intensity of forces for stabilizing the vehicle in space.

A further object of this invention is to provide a means of controlling the direction of thrust for reduction of slip and direction of flight.

A further object of this invention is to provide a novel means of fuel distribution and control.

Further objects and advantages of this invention will be apparent from a consideration of the accompanying specifications, claims, and drawings, of which Figure 1 is an illustration of the location of vertical propulsion units and horizontal propulsion units. The vertical propulsion units in this embodiment are placed at opposite corners of the vehicle.

Figure 2 is a functional diagram involving measurement of longitudinal acceleration and vertical thrust control.

Figure 3 is a functional diagram involving measurement of magnitude of roll and pitch of the vehicle for controlling fuel ignition.

Figure 4 is an illustration of the location of vertical propulsion units and horizontal propulsion units. The vertical propulsion units in this embodiment are placed in such positions to have predominant effect with reference to either pitch or roll axis.

Figure 5 is a functional diagram of traffic control apparatus comprising means for actuation of various visual effects as determined by actual heading of the vehicle.

Figure 6 is a functional diagram of a fuel control and distribution system showing the relation between pumps, valves, and temperature control elements for a reaction jet propulsion flight system of the class described.

Figure 7 is a functional diagram of a thrust control system of vertical propulsion units in one embodiment of this invention.

Figure 11 is a functional diagram of a thrust control system in a third embodiment of this invention.

Figure 12 is an illustration of the location of vertical propulsion units in a third embodiment of this invention.

Figure 8:
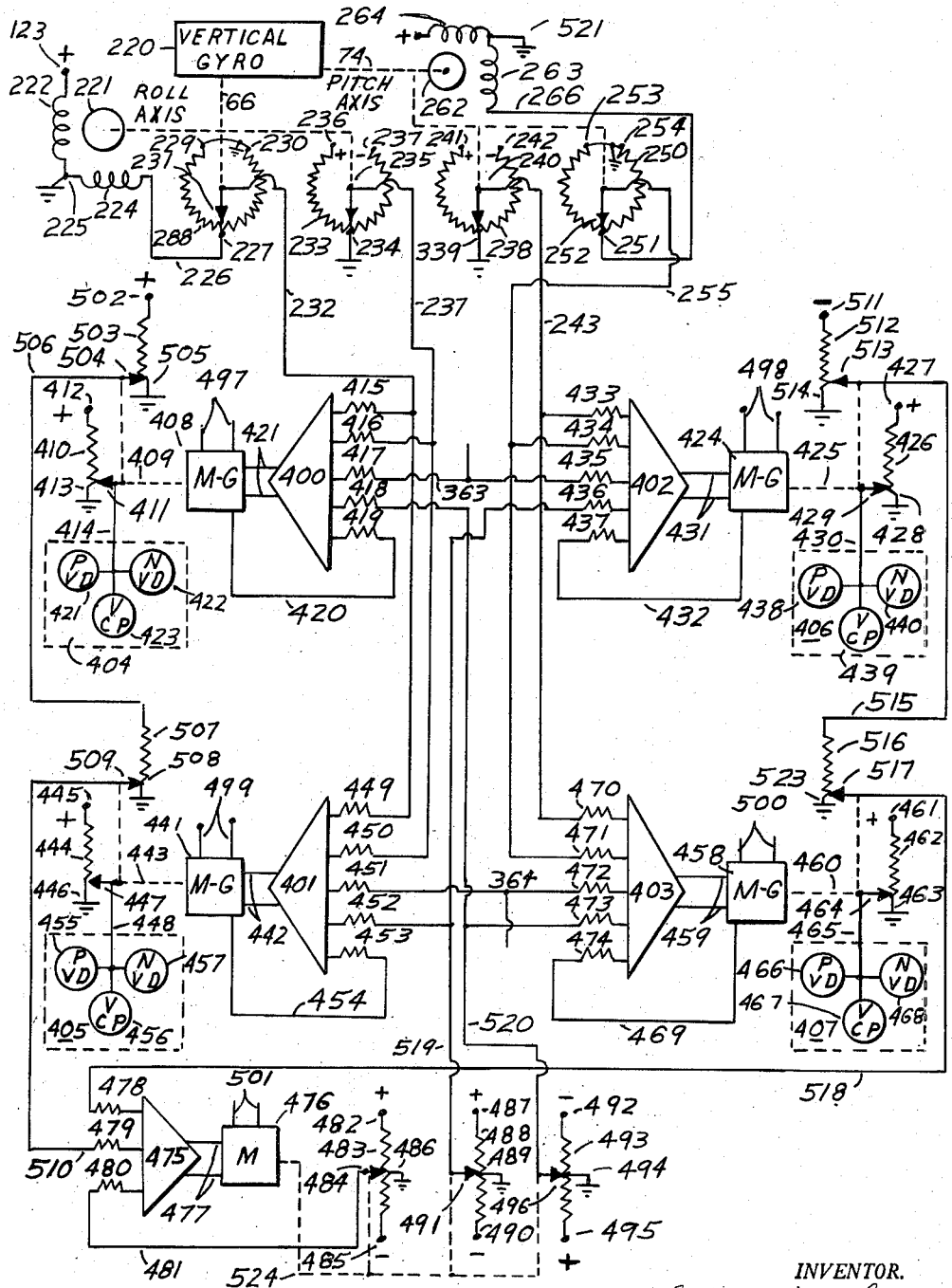
Figure 8 is a functional diagram of a thrust control system of vertical propulsion units in a second embodiment of this invention.

In Figure 1 is shown the location of vertical propulsion units 2, 3, 4, and 5 at opposite corners of the vehicle.

These vertical propulsion units direct their forces downward. These vertical propulsion units 2, 3, 4, and 5 are supported by ring clamps 12, 13, 14, and 15. Ring clamps 12, 13, 14, and 15 are connected to shafts 21, 22, 23, and 24 which are in turn connected with servomotors 7, 8, 9, and 10. Shaft extensions 17, 18, 19, and 20 are provided to give additional support to these propulsion units and are mounted on bearings (not shown) contained in the vehicle frame (not shown). Servometers 7, 8, 9, and 10 normally position the vertical propulsion units in a vertical position until slip along the lateral axis of the vehicle occurs. When slip occurs servomotors 7, 8, 9, and 10 cause rotation of the vertical propulsion units about their supporting shafts. Supporting shafts 21, 22, 23, and 24 extend parallel with respect to the longitudinal axis of the vehicle. Part of the force produced by propulsion units 2, 3, 4, and 5 when displaced from a vertical position will be lateral force of such direction to oppose this slip. Horizontal propulsion unit 6 is supported by ring clamp 16 connected with shafts 25 and 26. Shaft 25 connects with servomotor 11 controlled by desired heading of the vehicle. Shaft extension 26 is mounted on bearings (not shown) attached to the vehicle frame (not shown). Horizontal propulsion unit 6 is able to rotate by movement of shaft 25. The horizontal propulsion unit 6 directs its force directly rearward of the vehicle when no change of heading is required. When a change of heading is desired propulsion unit 6 rotates within the horizontal plane of the vehicle and directs a proportion of its force at some angle to cause rotation of the vehicle about the normal axis of the vehicle. Propulsion units 2, 3, 4, and 5 are limited in the degree of rotation away from their vertical positions to avoid any appreciable change in vertical displacement and stabilization of the vehicle. Propulsion unit 6 is limited in the degree of rotation away from the position of zero rate of yaw to avoid an appreciable change in forward velocity or unnecessary abrupt changes of heading.

This vehicle as shown has no means of support in flight other than the downward thrust produced by thrust force produced by propulsion units placed at opposite corners of the frame upon which these propulsion units are mounted. When the vehicle is suspended and stabilized with reference to a plane parallel with the earth's surface, the force produced by the downward force of each propulsion unit is determined principally by the distribution of mass of the device, the desired rate of vertical displacement, and displacement of the device about both longitudinal and lateral axis. If the vehicle is pitching downward due to a change of distribution of mass in the vehicle, propulsion units 2 and 3 should produce a greater thrust to oppose such pitching about the lateral axis. If the thrust is increased in the same proportion in both propulsion units 2 and 3 then this pitching downward would tend to be reduced in proportion to magnitude of thrust produced by propulsion units 2 and 3. When sufficient thrust is produced by propulsion units 2 and 3 to oppose this pitching motion the device will be motionless about the lateral axis but displaced at some angle of pitch. To correct for this angular displacement the thrust of propulsion units 2 and 3 must be increased whereby an upward pitching motion can be produced for a reduction of this angular displacement. When the device has positioned itself at a zero angle of displacement the thrust of propulsion units 2 and 3 must be decreased to such value to reduce this upward pitching motion to zero whereby the longitudinal axis of the vehicle will be stabilized parallel to the earth's horizontal plane. The increase in thrust produced by propulsion units 4 and 5, assuming the thrust of units 4 and 5 as constant, will cause an increased rate of vertical displacement along the normal axis of the vehicle. To avoid such change of displacement along the normal axis during variations of thrust by these propulsion units 2, 3, 4, and 5 an increase of thrust required by one propulsion unit requires a proportional decrease of thrust by the complementing propulsion unit associated with the particular axis involved. If it is necessary to increase the thrust of propulsion units 2 and 3 to obtain an upward pitching motion it is necessary to decrease the thrust of propulsion units 4 and 5. If the device rolls left side down, requiring an increase of thrust produced by propulsion units 2 and 5, then the thrust produced by propulsion units 3 and 4 must be decreased proportionally.

In Figure 7 is shown a control system for determining the magnitude of thrust for each vertical propulsion unit shown in Figure 1 as one embodiment of the invention. The operational servo amplifiers 49, 50, 51, 52, and 339 in this control system are typical analog computer elements incorporated in an A.C. computer system. The magnitude and phase of ouput for each amplifier will be determined by the summation of signals applied to the input resistor networks associated with each operational amplifier. The voltage source (not shown) is expressed plus for one phase and minus for the opposite phase (180 degrees). Potentiometers 233, 238, 244, 381, 366, 351, 358, and 361 are connected to this reference voltage source by either plus or minus connections as designated by minus or plus symbols adjacent to each potentiometer. The minus and plus phased reference voltages have equal magnitudes but are oppositely phased. Potentiometers 275, 308, 290, and 327 are connected to a D.C. power source compatible with the associated valves, nozzles, and pump motors controlled by the amplitude of signals from the wipers associated with these potentiometers. When this D.C. power source is switched off each valve and nozzle will close, thereby shutting off all thrust propulsion units. Figure 7 shows combustion agent control elements 137 comprising a variable delivery pump motor 139, variable delivery nozzle 148, and constant pressure valve 141 for controlling the thrust of vertical propulsion unit 2. Likewise the thrust of propulsion unit 3 is controlled by the combustion agent control elements 184 comprising a variable delivery pump motor 319, variable delivery nozzle 320 and constant pressure valve 321. Thrust of propulsion unit 5 is controlled by combustion agent control elements 183 comprising a variable delivery pump motor 300, variable delivery nozzle 302 and constant pressure valve 301. Thrust of propulsion unit 4 is controlled by combustion agent control elements 185 comprising a variable delivery pump motor 336, variable delivery nozzle 337, and constant pressure valve 338. Combustion agent control elements 137 are controlled electrically by lead 150 as determined by the position of wiper 273 contacted with potentiometer 275. The exciter windings of motor-generator 270 connect to the reference voltage power source by leads 271. Likewise the exciter windings of motor-generators 285, 303, 322, and 340 are connected to the reference voltage source by leads 286, 304, 323, and 342. The movement of wiper 235 is determined by operative connection 66 connected with vertical gyro 220. As the vehicle rolls left side down, wiper 235 rotates clockwise towards terminal 236 of potentiometer 233. Wiper 235 is normally at the midposition of potentiometer 233 when the vehicle is at a zero angle of roll. Terminal 236 is connected to the positive phased reference voltage and the signal appearing on lead 237 connected to wiper 235 will be in proportion to the deviation from zero angle of roll. The positive phased signal on lead 237 is applied through resistor 280 to operational servo amplifier 49. The operational servo amplifier 49 through output leads 277, motor-generator 270, and operating connection 272 causes wiper 273 to move towards terminal 274 and an increase of signal occurs on lead 150. The connections of operational servo amplifier 49 are such that this positive phased signal will cause an increased signal on lead 150 thereby increasing the rate of combustion of propulsion unit 2. Likewise the signal appearing on lead 237 is applied through resistors 295, 331, and 313 to operational servo amplifiers 50, 52, and 51. The output signals of operational servo amplifiers 50, 52, and 51 connected through output leads 292, 387, and 310 rotate motor-generators 285, 322, and 303. Connections made to motor-generator 285 are such that wiper 288 through operating connection 287 will move toward terminal 289 and the signal is increased on lead 196 and the thrust of propulsion unit 5 is thereby increased. Connections made to motor-generator 303 are such that wiper 306 through operating connection 305 will move toward terminal 309 and the signal is decreased on lead 199 and the thrust of propulsion unit 3 is thereby decreased. Connections made to motor-generator 322 are such that wiper 325 through operating connection 324 will move toward terminal 328 and the signal is decreased on lead 203 and the thrust of propulsion unit 4 is thereby decreased.

The output connections for each operational amplifier in Figure 7 are made such that the following variation in thrust will occur for a predominantly positive phased input signal as determined by the summation of the signals appearing at the junction of each input resistor network.

| Phase | Operational Amplifier | Propulsion Unit | Thrust change |
|---|---|---|---|
| plus | 49 | 2 | increase. |
| plus | 50 | 5 | increase. |
| plus | 51 | 3 | decrease. |
| plus | 52 | 4 | decrease. |

The change of thrust developed by propulsion units 2, 3, 4, and 5 are such that the resolution of forces about the roll axis will become changed in such manner to oppose a displacement of the vehcile at any angle with the exception of zero angle of roll. This is with reference to the signal on lead 237. The magnitude of change of thrust will be determined by the time and angle of displacement from zero angle of roll. The thrust change will become such that the vehicle will roll in the opposite direction and wiper 235 will move toward terminal 390. The vehicle will most likely pass through the angle of zero roll at which time the signal on lead 237 will become zero. The magnitude of thrusts of propulsion units 2, 3, 4, and 5 when considered with respect only to the signal appearing on lead 237, are integrations determined by the time and magnitude of angle of roll. If a clockwise roll is introduced to offset an initial counterclockwise roll, the vehicle would need to become displaced clockwise from the angle of zero roll whereby a correcting signal could be introduced on lead 237. To avoid hunting and to provide greater stability a second roll signal is introduced in proportion to rate of roll. The roll axis operating link 66 of vertical gyro 220 is connected to a generator armature 221. Generator exciter winding 222 is connected to a reference voltage source at terminal 223. The generator output winding 224 connects through lead 226 to terminal 227 of potentiometer 228. Wiper 231 is adjacent to center tap terminal 227 when zero roll angle exists. Connections of generator output winding 224 are such that a positive phased signal appears on lead 226 when a counterclockwise roll occurs. This positive phased signal appears on lead 232 in proportion to the displacement from the zero roll angle and rate of roll displacement. Generator armature 221 rotates at a speed determined by the rate of roll displacement. The gearing associated with generator armature 221 is such that generator armature 221 will rotate at a much greater rate than the roll axis operation connection 66 whereby a voltage will be induced in generator output winding for very small rolling rates. This positive phased signal appearing on lead 232 during counterclockwise roll tends to offset such direction of roll. Terminals 229 and 230 of potentiometer 228 are grounded causing this rate of roll signal to have predominant effect at zero angle of roll.

The signal appearing on lead 232 is such to cause damping of any roll through the angle of zero roll. Likewise when the vehicle is rolling clockwise the phase appearing on lead 232 is negative thus opposing such clockwise rotation particularly through the angle of zero roll. The signal on lead 232 is applied through resistors 279, 294, 312, and 330 to operational servo amplifiers 49, 50, 51, and 52 whereby thrust variation may be controlled also by rate of roll. Input resistors 279, 294, 312, and 330 are mutually the same value and are scaled so that the voltage appearing on lead 232 will not predominate over the signal on lead 237. Input resistors 280, 295, 313, and 331 are also each of the same mutual values so that equal changes of thrust for each vertical propulsion unit will occur when a signal appears on lead 237. Generator feedback resistors 284, 299, 317 and 335 connected to motor-generators 270, 285, 303, and 322 by leads 278, 293, 311, and 329 determine the rate of change of thrust by controlling the speed of operating connections 272, 287, 305, and 324. The gearing and friction characteristics of motor-generators 270, 285, 303, and 322 are the same as well as the effective gains of operational amplifiers 49, 50, 51, and 52 whereby these associated feedback resistors are mutually the same value to sustain the same rate of integration for each thrust control section when the same magnitude of signal is applied to operational amplifiers 49, 50, 51, and 52. Generator feedback resistors 284, 299, 317, and 335 are adjustable and ganged by mechanical linkage 388 to control 389 for selection of the desirable stabilization rate determined by such factors as vehicle mass distribution and operator's taste.

Pitch stabilization in Figure 7 is accomplished by the pitch axis operating connection 74 originating from vertical gyro 220. The wipers 240, 246, 252, and 258 of potentiometers 238, 244, 250, and 256 connect to the pitch axis operating connection 74. During zero angle of pitch wipers 240 and 246 are at ground potential determined by grounded center taps 239 and 245. Also wipers 252 and 258 are adjacent to terminals 251 and 257. When the vehicle pitches downward the following phases to each servo amplifier is required to obtain the necessary change of thrust.

| Phase | Operational Amplifier | Propulsion Unit | Thrust change |
|---|---|---|---|
| Plus | 49 | 2 | increase. |
| Minus | 50 | 5 | decrease. |
| Minus | 51 | 3 | increase. |
| Plus | 52 | 4 | decrease. |

When the vehicle pitches downward pitch axis operating connection 74 rotates in such direction that wiper 240 contacting potentiometer 238 rotates clockwise from the grounded center tap 239. Wiper 240 moves towards terminal 241 which contains a reference voltage of plus phase. The plus phased signal on lead 243 is applied to input resistors 281 and 332 whereby operational servo amplifiers 49 and 52 control the change of thrust for propulsion units 2 and 4. Wiper 246 rotates also in a clockwise direction toward terminal 247 which has reference voltage of minus phase. Lead 249 connected to wiper 246 applies this minus phased signal to resistors 314 and 296 whereby operational servo amplifiers 51 and 50 control the change of thrust for propulsion units 3 and 5. When the vehicle starts to pitch down the pitch axis operating connection begins to rotate whereby generator armature 262 rotates setting up a field in generator output winding 263. The generator output winding 263 is excited by the generator exciter winding 264 connected to the source of reference voltage. The gearing (not shown) of generator armature 262 is such that this armature rotates at a much greater rate than the pitch axis operating connection so that a voltage will be induced in the generator output winding 263 at very small pitching rates. Generator output winding 263 is connected to primary 269 of a phase reversal transformer having a secondary 268 center tapped at 265 to ground. Connections are made to secondary 268 in such manner that a plus phased signal appears on lead 267 when a downward pitching motion occurs. Lead 267 connects to the midpoint 251 of potentiometer 250. This potentiometer 250 has both ends 253 and 254 connected to ground. Wiper 252 in contact with potentiometer 250 connects with lead 255 which applies this plus phased signal through resistors 282 and 333 to servo amplifiers 49 and 52 so that a change of thrust of propulsion units 2 and 4 will occur in proportion to the rate of downward pitch and angle of pitch. Lead 266 contains a minus phased signal when lead 267 contains a plus phased signal. This minus phased signal is applied through lead 266 to the midpoint 257 of potentiometer 256. The potentiometer 256 also has both ends 259 and 260 tied to ground. Wiper 258 in contact with potentiometer 256 connects to lead 261 whereby this minus phased signal is applied through resistors 315 and 297 to servo amplifiers 51 and 50 so that a change of thrust of propulsion units 3 and 5 will occur in proportion to the rate of downward pitch and angle of pitch. Signals on leads 255 and 261 are such as to control the thrust of propulsion units 2, 3, 4, and 5 to dampen any pitch away from or through the angle of zero pitch. A pitch upward will cause a reversal of phase from generator output winding 263 and a change of thrust of respective propulsion units 2, 3, 4, and 5 to oppose such upward pitch. Resistors 282, 333, 315, and 297 are of equal value and are scaled to be such that signals through resistors 281, 332, 314, and 296 will have predominant control of pitching motion. The signals on leads 243 and 249 will control the stability of the vehicle about the pitch axis in proportion to the time of displacement and angle of displacement about the lateral axis of the vehicle.

Vertical displacement of the vehicle as well as roll and pitch stability is controlled by the magnitude of thrust of propulsion units 2, 3, 4, and 5. When switch arm 375 is in contact with terminal 378 a signal on lead 379 will be applied through input resistor 347 to operational servo amplifier 339. The signal on lead 379 is proportional to the displacement of wiper 384 from center tap 382 of potentiometer 381. Terminals 380 and 383 of potentiometer 381 connect to the reference voltage source. The operator's climb control 386 determines the rate of climb which is desired. When a zero rate of climb is desired the climb control 386 is set at zero and wiper 384 positions by operating connection 385 to ground. Answer potentiometer 351 provides a signal on wiper 354, lead 345, through input resistor 346 to oppose any displacement of operating connection 343 away from zero. When operating connection 343 is zeroed wipers 354, 357, and 360 are adjacent to the center taps of potentiometers 351, 358, and 361 and zero signal appears on leads 345, 363, 364. Terminals 353, 355, and 362 are connected to the reference voltage positive phase. Terminals 350, 356, and 359 are connected to the reference voltage negative phase. If the operator desires to move the vehicle upward at a specific rate he positions climb control 386 at this rate as indicated by a scale associated with this climb control 386. Wiper 384 moves towards positive phase terminal 380 and a signal is applied to amplifier 339 through input resistor 347, lead 374, switch arm 375, contact 378 and lead 379. Wiper 357 moves towards terminal 355 and a plus phased signal appears on lead 363 causing propulsion units 2 and 5 to increase thrust. Wiper 360 moves towards negative phased terminal 359 and a negative phased signal appears on lead 364 causing propulsion units 3 and 4 to increase thrust. Resistors 298, 283, 334, and 316 are mutually the same values so that an equal change of thrust will occur for a specific rate of climb or descent, thereby avoiding any appreciable roll or pitch. As the vehicle assumes the desired rate of climb, wiper 372, controlled by a rate of climb operating connection 371, will move towards negative phased terminal 365 of potentiometer 366 and a negative signal is applied on lead 373 through input resistor 348 to operational servo amplifier 339. When the rate of climb of the vehicle equals the desired rate of climb of control 386 the currents through input resistors 347 and 348 cancel out and operating connection 343 returns to zero by means of the servo answer voltage on lead 345. The thrust of propulsion units 2, 3, 4, and 5 tend to remain constant whereby the same rate of climb is maintained. If the vehicle should deviate from the desired rate of climb, the currents through input resistors 347 and 348 do not completely cancel out and operating connection 343 deviates from zero in proportion to this deviation from desired rate of climb, then signals appear on leads 363 and 364 to correct for this rate of climb deviation by changing the thrust of propulsion units 2, 3, 4, and 5. Resistor 349 and lead 344 provide a feedback loop which determines the abruptness of change of vertical displacements. Leads 342 connect to a power source of reference voltage for the excitation of motor and generator exciter windings. Likewise the other motor-generators in Figure 7 have leads 271, 286, 304, and 323 which connect to this same reference voltage power source for the excitation of motor and generator exciter windings.

Figure 9:
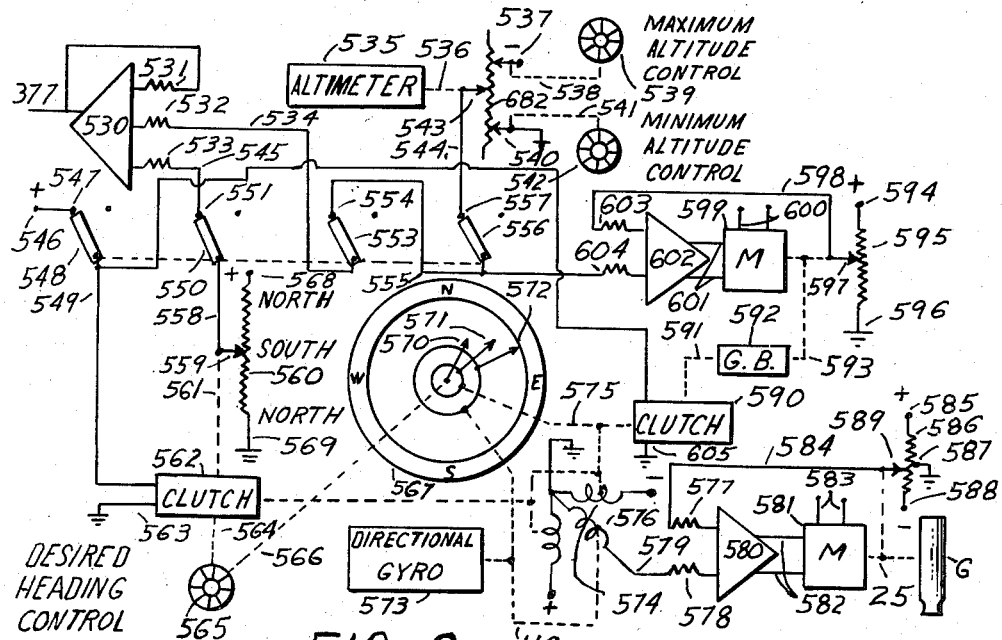
Figure 9 is a functional diagram of a control system for automatic stabilizing the heading of the vehicle.

In Figure 9 is shown how vertical displacement is controlled by altitude and heading. When switch 375 is connected to lead 377 a proportion of thrust of each vertical propulsion unit is controlled by the desired heading of the device whereby the device will automatically assume an altitude determined by desired heading. An automatic means of traffic control is established in which the heading of the device depends upon the altitude of the device. In Figure 9 is shown the source of thrust control signal on lead 377 connected to the output of operational amplifier 530. Operational amplifier 530 is an A.C. degenerative feedback amplifier having a feedback loop through lead 377 to resistor 531. Switch arms 548, 550, 553, and 556 are ganged together and when switch arm 548 is connected with contact 547 switch arm 550 connected with switch contact 551, switch arm 553 connected with contact 554, and switch arm 556 connected with contact 557 the output signal from operational amplifier 530 is proportional to altitude and desired heading of the device and the actual heading of the device will be determined by the altitude of the device. When the operator sets in a desired heading by control 565, needle 570 connected by operating connection 566 is positioned to this heading as shown by indicator 567. Operating connection 564 also moves wiper 559 on potentiometer 560 which is single ended having one terminal 568 connected to the plus side of the reference voltage and terminal 569 to ground. Wiper 559 picks off a signal proportional to the desired heading and this signal is applied to resistor 533. A second signal through resistor 532, lead 534, switch arm 553, switch contact 554, lead 555, switch arm 556, switch contact 557, lead 544 and wiper 543 originates from potentiometer 682. Wiper 543 is positioned by operating connection 536 controlled by altimeter 535. In operation the operator would set altitude controls 539 and 542 in accordance with various traffic regulations involving stacking of such vehicles with respect to altitude and heading within a specified total altitude range. The system shown here designates a north heading at either the minimum altitude level or maximum altitude level. If the device is traveling in a north direction at the minimum altitude level wiper 559 will be positioned at the ground end of potentiometer 560 and zero voltage will be applied to operational amplifier 530 through resistor 533. Wiper 543 controlled by the altitude of the device will be positioned also at the ground end of potentiometer 682. If a north heading is desired but the device is at an altitude slightly above the minimum altitude then a signal of such phase is applied to operational amplifier 530 through resistor 532 that the device will decrease altitude. Resistors 532 and 533 are of the same value to utilize the full altitude range through 360 degrees of heading. If wiper 559 of potentiometer 560 is positioned at one-half of its total displacement the ratio of reference voltage applied to resistor 533 will be one-half. The magnitude and phase of signal from operational amplifier 530 will depend upon the summation of signals applied to resistors 532 and 533 and will depend upon the position of wiper 543 relative to wipers 537 and 540 on potentiometer 682. The actual heading of the vehicle is controlled by the direction of thrust of horizontal propulsion which is produced by propulsion unit 6. Figure 9 shows horizontal propulsion unit 6 positioned by mechanical linkage 25, servo motor 581, connecting leads 582, servo amplifier 580, and input resistors 577 and 578. The position of propulsion unit 6 is proportional to the magnitude and phase of signal from the resolver rotor winding 576 connected with lead 579 and resistor 578. Answer potentiometer 586 is double ended having its terminals 585 and 588 connected with opposite phased reference voltage and is center tapped to ground at terminal 587. Wiper 589 is controlled by operating connection 25 and connected by lead 584 to resistor 577. Propulsion unit 6 servos with respect to the amplitude and phase of the signal on lead 579. Normally the propulsion unit 6 directs its thrust parallel with the longitudinal axis of the vehicle and the resolution of thrust force is perpendicularly through the normal axis of the vehicle to avoid any turning of the vehicle about the normal axis. Wiper 589 is normally positioned at the midpoint of potentiometer 586 at a ground potential. Resolver stator windings 574 are pivoted by mechanical linkage 575 controlled by the servo system consisting of servo motor 599, servo motor control leads 601, and servo amplifier 602. Contact 547 is connected to a D.C. power source and lead 549 is energized whereby solenoid clutch 590 connects together operating connections 591 and 575. Likewise solenoid clutch 562 is energized through lead 549 and operating connections 561 and 564 are connected together. During heading versus altitude operation, operating connection 593 positions with respect to altitude of the device in proportion to a desired altitude range. Gear box 592 transfers a rotation of operating connection 593 from an angular rotation less than 360 degress to a rotation of exactly 360 degrees for an equivalent rotation of resolver stator windings 574 through any required compass heading. Clutch 590 engages mechanical links 591 and 575 during heading versus altitude when switch arm 548 is switched to contact 547. The rotation of mechanical linkage 593 is determined by the amplitude of negative phased signal on lead 555 connected with input resistor 604 to operational servo amplifier 602. Answer potentiometer 595 provides a positive phased signal on wiper 597, lead 598, through input resistor 603 whereby the mechanical linkage 593 positions itself in proportion to the signal on lead 555. The position of mechanical linkage 593 varies with respect to the altitude of the vehicle within the traffic altitude range. Resolver stator windings 574 are positioned by mechanical linkage 575 to provide a reference heading as determined by altitude of the device. The signal magnitude and phase from resolver rotor 576 will depend upon the reference heading and actual heading of the device. Resolver rotor 576 is positioned by directional gyro 573 through operating connection 110.

During heading versus altitude flight the operator will set a desired heading by control 565 as indicated by needle 570 on indicator 567. Resolver stator windings 574 will be positioned at a reference heading determined by the actual altitude of the device within an altitude range determined by the settings of altitude controls 539 and 542. The magnitude and phase of signal from the resolver rotor winding 576 depends upon this reference heading and actual heading. When the actual heading and reference heading are the same then the signal induced in rotor winding 576 will cancel out and zero signal will be applied to lead 579, then the direction of thrust of propulsion unit 6 will induce zero change of heading. Needle 571 in indicator 567 will indicate the reference heading necessary at the present altitude of the device. Needle 572 in indicator 567 will show the actual heading of the device. If the desired heading differs from the reference heading, a change of altitude will occur in direction depending upon the desired heading. As the altitude changes the reference heading will change and the device will assume an actual heading in accordance with the reference heading. The vehicle will slowly assume an altitude necessary for the desired heading but while but while the device is assuming this altitude the device will head in the direction that is necessary at the present altitude of the device whereby this automatic traffic control can be maintained. Potentiometer 560 is constructed in such manner that wiper 559 will not go beyond the limits of resistance segment of potentiometer 560. The direction of rotations of mechanical linkages 564, 593, 110, and 536 are chosen so that a clockwise change of heading requires an increase of altitude.

If the vehicle is heading north at the minimum altitude range and if the operator desires to assume a NNW heading with adherence to this traffic control system, the operator would set his desired heading control 565 to NNW as indicated by needle 570 in indicator 567. The device would increase in altitude and change its heading in a clockwise direction from north to east. When the vehicle reaches one-half the total altitude range the vehicle would be heading south and as the altitude is still increased the vehicle would swing in a clockwise direction to the NNW position when the necessary altitude has been reached. If the operator now desires to obtain a NNE position in accordance with this traffic control system the desired heading control is set to NNE and the vehicle decreases in altitude and its heading is changed in a counterclockwise direction so that the same heading at a specific altitude will be assumed either for increase or decrease in altitude. Resistor 531 of amplifier 530 is scaled so that the output voltage will not exceed limits determined by the maximum rate of climb or descent desired during heading versus altitude vehicle control.

Control of heading by the operator is obtained when switch arm 548 is disconnected from switch contact 547, switch arm 550 disconnected from switch contact 551, switch arm 553 disconnected from switch contact 554, and switch arm 556 disconnected from switch contact 557. Servo amplifier 530 is rendered inoperative during manual heading control. Clutch 562 disengages wiper 559 and mechanical linkage is made from the operator's heading control to the resolver stator winding 574 by operative connection 575. Clutch 590 also disengages mechanical linkage 591 to the resolver stator windings 574. The operator is able to change the reference position of resolver stator windings 574 by mechanical linkage 575 when solenoid clutch 562 is not energized.

Figure 10:
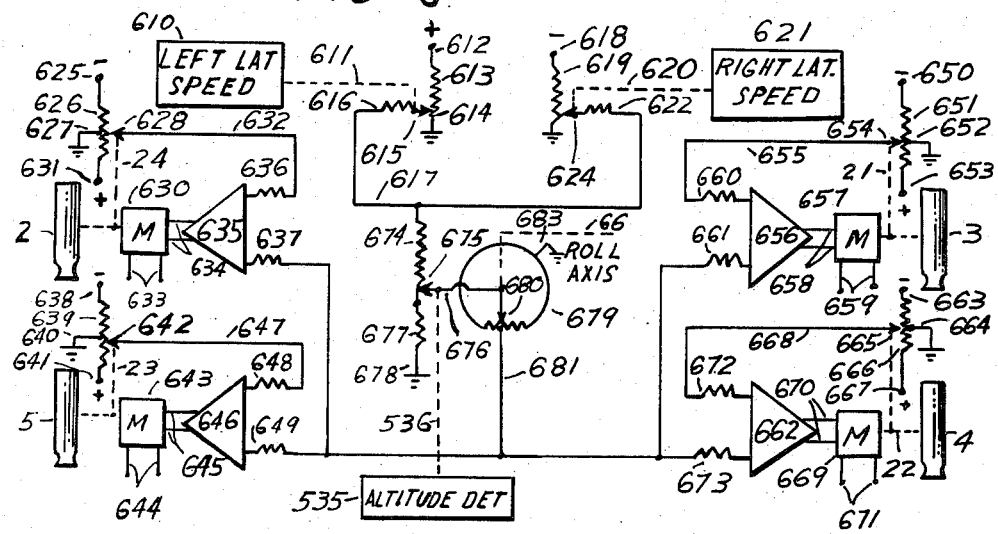
Figure 10 is a functional diagram of a control system for measuring and controlling slip.

Figure 10 comprises a servo system for each vertical propulsion unit whereby each unit can be rotated over a limited range about a line through the midpoint of each propulsion unit and extending parallel along the longitudinal axis of the device. This rotation is such that a thrust force can be produced along the lateral axis of the vehicle to oppose slip that may occur during flight. Rotation of propulsion unit 2 is accomplished through mechanical linkage 24, servo motor 630, motor control leads 634 and servo amplifier 635. Propulsion unit 2 assumes a position depending upon the magnitude and phase of signal on lead 681 applied through resistor 637 and limited by double ended answer potentiometer 626. Potentiometer terminals 625 and 631 connect to the reference voltage and center tapped to ground at 627. The position of wiper 628 depends upon displacement of mechanical linkage 24. A signal on wiper 628 is applied through lead 632 and resistor 636 to oppose in phase and magnitude the signal applied to resistor 637. Propulsion unit 3 assumes a position depending upon the magnitude and phase of signal on lead 681 applied through resistor 661 and limited by double ended answer potentiometer 651. Potentiometer terminals 650 and 653 connect to the reference voltage and center tapped to ground at 652. The position of wiper 654 depends upon displacement of mechanical linkage 21. A signal on wiper 654 is applied through lead 655 and resistor 660 to oppose in phase and magnitude the signal applied to resistor 661. Propulsion unit 5 assumes a position depending upon the magnitude and phase of signal on lead 681 applied through resistor 649 and limited by double ended answer potentiometer 639. Potentiometer terminals 638 and 641 connect to the reference voltage and center tapped to ground at 640. The position of wiper 642 depends upon displacement of mechanical linkage 23. A signal on wiper 642 is applied through lead 647 and resistor 648 to oppose in phase and magnitude the signal applied to resistor 649. Propulsion unit 4 assumes a position depending upon the magnitude and phase of signal on lead 681 applied through resistor 673 and limited by double ended answer potentiometer 666. Potentiometer terminals 663 and 667 connect to the reference voltage and center tapped to ground at 664. The position of wiper 665 depends upon displacement of mechanical linkage 22. A signal on wiper 665 is applied through lead 668 and resistor 672 to oppose in phase and magnitude the signal applied to resistor 673. When the device slips to the left, lateral air speed will be determined by left air speed detector 610 which has a Pitot tube positioned to pick up the pressure produced by this left lateral air speed. Mechanical linkage 611 rotates in proportion to magnitude of left lateral air speed and wiper 615 is displaced proportionally from ground 614. A signal of positive phase is applied to wiper 615 through resistor 616 to one terminal of potentiometer 674. Potentiometer 674 provides slip detection as a function of altitude whereby the decrease in air density with increase in altitude will be compensated so as to maintain the same effective slip correcting force. Altitude detector 535 connected by operating connection 536 to wiper 675 moves wiper 675 towards the terminal connected to lead 617 when the vehicle increases in altitude. For a specific slip velocity the signal on lead 676 will be constant as altitude is increased. Variation of position of wiper 675 as a function of altitude causes a smaller signal to have the same slip correcting value for a specific slip velocity when altitude is increased. Resistor 677 determines the magnitude of slip correction at zero altitude. The signal from wiper 675 is applied to wiper 680 through lead 676. Potentiometer 679 contains a resistance segment through only a small proportion of the total displacement. The other part of the potentiometer is at ground potential. Lead 681 connects to the mid-position of the resistance segment of potentiometer 679. Wiper 680 varies with the displacement of the device away from zero angle of roll as controlled by roll axis operating connection 66. As the device deviates from a zero angle of bank, the slip correction is reduced by controlling the position of wiper 680. Thus the introduction of another component of force is lessened to avoid any change of altitude introduced by slip correction forces. When the device slips to the right, lateral air speed is determined by a second air speed detector 621 having a Pitot tube positioned to pick up the pressure produced by this right lateral air speed. Mechanical linkage 620 rotates in proportion to magnitude of right lateral air speed and wiper 624 is displaced proportionally from ground. A signal of negative phase is applied through resistor 622, lead 617, to potentiometer 674. The signal on lead 681 will then be negative in phase in proportion to altitude and angle of roll. Resistors 616 and 622 are isolation resistors to avoid shorting to ground a signal from wiper 624 when wiper 615 is at ground or vice versa. Resistors 637, 649, 661, and 673 are mutually the same value whereby the angle of rotation of propulsion units 2, 3, 4, and 5 will be the same for each unit for a given signal on lead 681 so that rotation around the normal axis of the device will be negligible when correcting for slip. When the phase is positive on lead 681, each vertical propulsion unit rotates the same amount, and the angular position will be determined by the magnitude of slip as controlled by answer potentiometers 626, 639, 651, and 666.

In Figure 2 a means for changing the vertical thrust in proportion to the speed of the device is accomplished. Although an object of this application is to present a flight system which does not require concern as to airfoil structure for creating lift, it is assumed that any device used for flight will be of such form that some lift will be introduced at high speeds. As the speed is increased the thrust necessary for vertical suspension may become reduced depending upon the airfoil characteristics of the device. Weight 32 is sensitive to any change of longitudinal acceleration and is connected with a flat spring 31 to the device frame 30. Wiper 34, connected with weight 32, is displaced by the magnitude of longitudinal acceleration and a signal is produced on leads 40 and 48 in proportion to such acceleration. Potentiometers 35 and 42 are double ended and connected to the reference voltage supply source designated with respect to phase. Center taps 36 and 43 are aligned with wipers 34 and 46 at ground potential at zero acceleration. Resistors 53, 54, 55, and 56 connect with servo amplifiers 49, 50, 51, and 52. These servo amplifiers control the magnitude of thrust to propulsion units 2, 3, 4, and 5. When the device is increasing its longitudinal velocity, then wipers 34 and 46 move forward and a negative phased signal is applied to lead 40. The servo and thrust system associated with servo amplifiers 49 and 50 are phased in such manner that a negative phased signal will reduce the thrust of propulsion units 2 and 5 depending upon the duration and magnitude of this signal. The positive signal on lead 48 is phased so that propulsion units 3 and 4 will also have a reduction of thrust in proportion to duration and magnitude of signal. Resistors 53, 54, 55, and 56 are mutually the same value so that thrust will decrease equally in each vertical propulsion unit preventing any unnecessary roll or pitch. The value of resistors 53, 54, 55, and 56 will depend upon such factors as the airfoil lift characteristics of the device, flexibility of spring 31, and relative values of other resistors in the summing networks associated with servo amplifiers 49, 50, 51, and 52.

In Figure 6 is shown the combustion agents control and distribution for a reaction jet propulsion system utilizing the forces produced by the ignition of fuel and oxidizing agents. The use of rocket power for producing the vertical and horizontal forces is chosen as one of the best means of producing these forces with the least weight and space requirements. However, the invention is not limited to this one means of producing such forces. The combustion agents control system shown in Figure 6 provides a flexible means of controlling the pressure, rocket shell temperature, and combustion agent injection. Each propulsion unit contains separate pumps and valves whereby the pressure will be varied as determined by the thrust desired for each propulsion unit. Tank 130 contains the oxidizing agent which is delivered by conduit 132 to pump 133. Pump 133 is driven by operating connection 135 connected with motor 136. Conduit 134 delivers the oxidizing agent to propulsion unit control systems 137, 183, 184, 185, and 186. Control systems 137, 183, 184, 185, and 186 contain the pumps, valves, and propulsion apparatus associated with each individual rocket unit. Within propulsion system 137 is also contained rocket unit 2 shown by dotted lines within system 137. The signal on lead 150 determines the magnitude of thrust as explained with reference to Figure 7. Lead 150 is connected to pump motor 164 whereby an increased pressure can be developed when the magnitude of signal on lead 150 is increased. Pump motor 164 connects with pump 139 by operating link 165. Conduit 140 applies the highly pressurized oxidizing agent to pressure control valve 141. Pressure control valve is solenoid actuated whereby the pressure can be controlled by the magnitude of signal on lead 150. Pressure control valve 141 is connected to conduit 159 to provide an oxidizing agent relief path to return the oxidizing agent to tank 130. Pressure control valve 141 is calibrated for a specific pressure at a specific signal magnitude on lead 150 whereby the oxidizing agent in conduit 142 will be at a specific pressure determined by the thrust desired for propulsion unit 2. Two way valve 143 selects the path for the oxidizing agent to injector nozzle 148. Flexible couplings 144, 146, 160, 163, and 174 allow propulsion unit 2 to rotate for correction of slip during flight of the vehicle. Propulsion unit 2 contains two coils 189 and 147 within the jacket or framework of the rocket unit to provide a means for heat exchange and cooling the rocket jacket. Temperature sensing element 151 contained within the jacket of the rocket unit 2 determines the operating temperature of the rocket unit 2 and is connected by lead 152 to a source of positive D.C. The resistance of temperature sensing element 151 decreases as the temperature increases within rocket unit 2 so that the positive potential on lead 153 will decrease with increased temperature, whereby tube 190 will have an increased conduction rate. As tube 190 increases conduction the solenoid contained within two way valve 143 will actuate in such direction as to cause an increased proportion of oxidizing agent through conduit 145, flexible coupling 146, and cooling coil 147. An increased proportional flow through coil 147 will reduce the temperature within propulsion unit 2. When propulsion unit 2 is operating very cool a bias is developed by cathode resistor 158 whereby tube 190 will be cut off and no conduction will occur. The heat developed by the rocket units is used for driving a turbine 191 connected to generator 193 by operating connection 192. Generator 193 supplies the power for driving the motors and other electrical equipment used in the device. Condenser 179 contains an expansible medium used for driving turbine 191. A closed loop turbine system is shown herein, in which is specified the use of water as the expansible medium however this invention is not limited to water as the expansible medium. The outlet of condenser 179 is connected to pump 182 by conduit 180. Pump 182 is connected to motor 181 by operating connection 209. The output of pump 182 is connected by conduit 161 to heat exchanger portion 166 and thence to conduit 162. Conduit 162 connects with simular coils about the jackets of rockets contained in propulsion systems 186, 185, 184, and 183 similarly as shown by coil 189 in propulsion system 137. Coil 189 is in heat exchange relation to the jacket of rocket unit 2. The output of coil 189 feeds through flexible coupling 163 to conduit 187. Conduit 187 also connects with the expanding medium outputs of propulsion systems 183, 184, 185, and 186 which likewise have been exposed to the heat surrounding the coils contained within their rocket jackets. Steam which has been developed by this heat transference appears in conduit 187 which is so connected to turbine 191 to provide mechanical displacement of link 192 whereby generator 193 may be rotated. The output of turbine 191 connects with heat exchanger portion 194 and thence to condenser 179. Heat transference between 194 and 166 provides initial expansion of the medium. Tank 131 contains the fuel for the reaction jet propulsion units. The outlet of tank 131 is connected by conduit 207, heat exchanger portion 208, conduit 209, to pump motor 167. Condensation of the expansible medium is encouraged by coil 208 contained within condenser 179. Pump 167 is driven by motor 136 through operating connection 135. The output of pump 167 connects with conduit 168 which supplies the fuel for each propulsion unit. Pump 169, connected to motor 164 by operating connection 165, boosts the pressure of the fuel agent to the desired pressure level depending upon the magnitude of thrust desired. Pressure control valve 171 determines the specific pressure of fuel determined by the magnitude of signal on lead 150. Conduit 172 provides a fuel pressure relief path for returning excess fuel back to the fuel tank 131. The output of valve 171 is connected with conduit 173, flexible coupling 174, conduit 175, and fuel injector 176. Fuel injectors 148 and 176 contain solenoids whereby the fuel injector nozzle apertures will become enlarged for an increased magnitude of signal on lead 150. Pumps 139 and 169 will normally pump at such rates that a larger pressure is available within conduits 140 and 170 than necessary within conduits 142 and 173. Motor speed of motor 164 is calibrated with regard to the signal appearing on lead 150 so that a larger pressure than is necessary will be sustained at all times by pumps 139 and 169. The efficiency of combustion is sustained at a high level through the entire thrust range by control of both pressure and injector nozzle aperture. The pressure control valves and injector nozzles are calibrated against each other through the signal magnitude range on lead 150. Terminal 154 provides a source of plus D.C. for the temperature sensing element 151 and the two way valve 143. Terminal 149 provides a ground return for the signal applied to lead 150 through pump motor 164, pressure control valves 141 and 171, and injector nozzles 148 and 176. Likewise lead 196 of propulsion section 183 controls the thrust of propulsion unit 5 by the use of pumps, valves, and injector nozzles contained in section 183. Lead 197 is the ground return for the signal on lead 196. Lead 195 connects with the source of plus D.C. for temperature control of propulsion section 183. Lead 199 of propulsion section 184 controls the thrust of propulsion unit 3 by the use of pumps, valves, and injector nozzles contained in propulsion section 184. Lead 200 is the ground return for the signal on lead 199. Lead 198 connects with the source of plus D.C. for temperature control of propulsion section 184. Lead 203 of propulsion section 185 controls the thrust of propulsion unit 4 by the use of pumps, valves, and injector nozzles contained in propulsion section 185. Lead 202 is the ground return for the signal on lead 203. Lead 201 connects with the source of plus D.C. for temperature control of propulsion section 186. Lead 206 is connected to wiper 211 of potentiometer 213. One end of potentiometer 213 is connected to a source of D.C. and the other end is connected to ground. Control 212, connected by operating connection 214 determines the position of wiper 211 whereby the thrust of propulsion unit 6 can be selected by the operator by control of pumps, valves, and injector nozzles contained in propulsion section 186. Propulsion unit 6 projects its thrust normally parallel to the earth's horizontal plane. Thus control 212 determines the speed of displacement of the vehicle along the earth's horizontal plane. Furthermore, propulsion sections 183, 184, 185, and 186 are connected to the oxidizing agent distributing conduit 134, oxidizing agent pressure relief conduit 159, fuel agent distributing conduit 168, fuel agent pressure relief conduit 172, expansible medium intake conduit 162, and expansible medium outlet conduit 187 whereby the propulsion sections will function similar to propulsion section 137. Control 178 is connected to the cathode resistor 158 by operating connection 177 whereby the conduction of tube 190 can be varied with respect to the position of control 178 and the temperature of propulsion unit 2. Control 178 determines the average temperature of propulsion unit 2; thus providing a means of controlling the expansion of the fluid medium flowing through coil 189. Control 178 also is connected by operating connection 177 to similar elements contained in propulsion sections 183, 184, 185, and 186 whereby the average temperature for propulsion units 2, 3, 4, 5, and 6 is sustained at the value determined by the position of control 178. Control 178 thus determines the speed of turbine 191 and temperature of the rocket unit jackets.

In Figure 4 is shown another embodiment of the invention in which the vertical propulsion units 80, 81, 82, and 83 are positioned so that their predominant effects are with respect to either the pitch or roll axis of the vehicle. Propulsion units 80 and 82 are positioned at opposite ends of the vehicle in a line through the center of the vehicle designated the longitudinal axis of the vehicle. Propulsion units 81 and 83 are positioned at opposite sides of the vehicle in a line through the center of the vehicle designated the lateral axis of the vehicle. If the vehicle rolls left side down, supposedly from a change of balance of the vehicle mass, then the thrust of propulsion unit 83 must increase whereby this counterclockwise roll can be opposed. If the thrust of propulsion unit 81 is constant and the thrust of propulsion unit 83 is increased to stabilize the vehicle at zero angle of roll, then the vehicle will most likely start to climb due to the increased thrust produced by propulsion unit 83. To avoid unecessary vertical displacements and to provide a stabilizing system that functions independently of vertical displacement of the vehicle, it is necessary to decrease the thrust of propulsion unit 81 when the thrust of propulsion unit 83 is increased. Likewise when the vehicle noses down the thrust of propulsion unit 80 must be increased and the thrust of propulsion unit 82 decreased. Horizontal propulsion units 84 and 85 provide a means of displacing the vehicle along the earth's horizontal plane. Vertical propulsion units 80, 81, 82, 83, 84, and 85 are supported by ring clamps 92, 93, 94, 95, 106, and 107. These ring clamps are connected to shafts 98, 99, 100, 101, 108, 109 which are in turn connected with servomotors 86, 87, 88, 89 90, and 91. Shaft extensions 92, 93, 94, 95, 96, and 97 are provided to give additional support to these propulsion units and are mounted on bearings, not shown, contained in the vehicle frame, not shown. Servomotors 86, 87, 88, and 89 normally position the vertical propulsion units in a vertical position until slip along the lateral axis of the vehicle occurs. When slip occurs, servomotors 86, 87, 88, and 89 cause rotation of the vertical propulsion units about their supporting shafts. Supporting shafts 92, 93, 94, 95, 98, 99, 100, and 101 extend parallel with respect to the longitudinal axis of the vehicle. Part of the forces produced by propulsion units 80, 81, 82, and 83, when displaced from a vertical position will be lateral force of such direction to oppose this slip. Shafts 96, 97, 109, and 108 extend parallel to the normal axis of the vehicle whereby propulsion units 84 and 85 swivel about their shafts as determined by the change of heading required.

In Figure 8 is shown the computer system for determining the thrust needed for each vertical propulsion unit when the locations of the propulsion units have effect predominantly about either the longitudinal or lateral axis. In Figure 4 is shown the location of propulsion units 80, 81, 82, and 83 requiring a compatible computer system as shown in Figure 8. Section 404 contains variable delivery pump 421, constant pressure valve 423, and variable delivery nozzle 422 for propulsion unit 83. Section 405 contains variable delivery pump 455, constant pressure valve 456, and variable delivery nozzle 457 for propulsion unit 81. Section 406 contains variable delivery pump 438, constant pressure valve 439, and variable delivery nozzle 440 for propulsion unit 80. Section 407 contains variable delivery pump 466, constant pressure valve 467, and variable delivery nozzle 468 for propulsion unit 82. A reference signal power source is used for the required reference signal source for potentiometer 233, 238, 503, 512, 483, 488, and 493; generator windings 222 and 264, motor-generators 408, 441, 424, 458, and 476. Terminals 236, 241, 123, 264, 482, 487, 502, and 495 connect to the positive phased reference voltage source. Terminals 237, 242, 485, 490, 511, and 492 connect to the negative phased reference voltage source. Power leads 497, 498, 499, 500, and 501 also connect to this reference voltage power source for energizing the motor and generator exciter windings. Terminals 412, 427, 445, and 461 connect with a regulated D. C. power source used for controlling the valves, nozzles, and motors for each propulsion unit determined by the proportion of D. C. signal applied to these components. Ground connections 225, 521, 234, 239, 505, 508, 514, 523, 486, 489, 229, 230, 253, 254, and 494 provide ground returns to the reference voltage source. Ground connections 413, 446, 428, and 463 provide ground returns to the D. C. power source. Wiper 235 moves in accordance with the roll axis operating connections 66 connected with vertical gyro 220. As the vehicle tilts left side down, wiper 235 moves away from ground 234 toward terminal 236. Terminal 236 is connected to the reference voltage positive phase and therefore a positive phased signal appears on lead 237. The signal on lead 237 is applied through resistor 416 to operational amplified 400. Output leads 421 connect with motor-generator 408. The output of motor-generator 408 connects with operating connection 409 for movement of wiper 411 in response to rotation of motor-generator 408. Wiper 411 will move towards terminal 412 of potentiometer 410 when a positive phased signal is applied to operationl amplifier 400 at the junction of input resistors 415, 416, 417, 418, and 419. When wiper 411 moves towards terminal 412 the magnitude of signal on lead 414 will increase and the combustion agent control elements 421, 422, and 423 contained in section 404 will operate in such manner to increase the thrust of propulsion unit 83. When the vehicle tilts left side down the thrust of propulsion unit 83 will increase and the new resolution of forces about the longitudinal axis will tend to oppose this initial direction of tilt. Likewise, the thrust of propulsion unit 81 is determined by the magnitude of signal on lead 448 as determined by the location of wiper 447 in contact with potentiometer 444. Wiper 447 moves in accordance with movement of operating connection 443, rotation of motor-generator 441, energization of output leads 442, output of amplifier 401, and resultant signal at the junction of input resistors 449, 450, 451, 452, and 453. The thrust of propulsion unit 80 is determined by the magnitude of signal on lead 430 as determined by the location of wiper 429 in contact with potentiometer 426. Wiper 429 moves in accordance with movement of operating connection 425, rotation of motor-generator 424, energization of output leads 431, output of amplifier 402, and resultant signal at the junction of input resistors 433, 434, 435, 436, and 437. The thrust of propulsion unit 82 is determined by the the magnitude of signal on lead 465 as determined by the location of wiper 464 in contact with potentiometer 462. Wiper 464 moves in accordance with movement of operating connection 460, rotation of motor-generator 458, energization of output leads 459, output of amplifier 403, and resultant signal at the junction of input resistors 470, 471, 472, 473, and 474.

Electrical connections and mechanical linkages are established in this system shown in Figure 8 so that for a positive phase appearing at the input resistor junction point for each operational amplifier a specific direction of change of thrust will occur as follows:

| Phase | Operational Amplifier | Propulsion Unit | Thrust change |
|---|---|---|---|
| plus | 400 | 83 | increase. |
| plus | 401 | 81 | decrease. |
| plus | 402 | 80 | increase. |
| plus | 403 | 82 | decrease. |

A positive signal on lead 237 will cause an increased thrust for propulsion unit 83 and a decreased thrust for propulsion unit 81, and the resultant forces about the longitudinal axis will change to cause a clockwise roll. The signal on lead 237 will thus vary in phase to introduce a change of thrust for correcting tilt about the longitudinal axis. Lead 237 is connected to amplifier 400 through input resistor 416 and also connected to amplifier 401 through input resistor 450 for effecting a change of thrust for propulsion units 83 and 81. Roll axis operating connection 66 is also linked to generator armature 221 and a signal is induced in generator output winding 224 determined by the rate of roll. Generator exciter winding 222 is connected to the reference voltage power source by terminal 123. The signal phase appearing on lead 226 is positive when the vehicle rolls counterclockwise for effecting a change of thrust of propulsion units 83 and 81 for clockwise direction of roll. Lead 226 is connected to center tap terminal 227 of potentiometer 288. Terminals 229 and 230 are connected to ground whereby the predominant effect of the rate of roll signal on wiper 231 and lead 232 will be at zero angle of roll. Likewise a negative signal will appear on lead 226 when the vehicle rolls clockwise and the magnitude of signal on lead 232 will be determined by the degree of tilt about the roll axis. Lead 232 is connected to amplifier 400 through input resistor 415 and connected to amplifier 401 through input resistor 449; for effecting a change of thrust for propulsion units 83 and 81. Pitch axis operating connection 74 originates from vertical gyro 220 whereby wiper 240 moves in accordance with tilt of the vehicle about the pitch axis. If the vehicle pitches downward, wiper 240 moves towards terminal 241 of potentiometer 238 and a positive phased signal appears on lead 243 determined by the degree of tilt. Lead 243 connects with amplifier 402 through input resistor 433 and propulsion unit 80 will increase thrust when the phase is positive on lead 243. Lead 243 connects with amplifier 403 through input resistor 470 and propulsion unit 82 will decrease thrust when the phase is positive on lead 243. The resultant change of forces about the pitch axis thus tend to cause rotation for restoring the vehicle towards its zero angle of pitch. Likewise, if the vehicle should tilt upward the phase on lead 243 will become negative because wiper 240 will move toward terminal 242 and the resultant change of forces about the pitch axis thus tend to cause rotation of the vehicle towards its zero angle of pitch. Pitch axis operating connection 74 is also linked to generator armature 262 and a signal is induced in generator output winding 263 determined by the rate of pitch. Generator exciter winding 264 is connected with the reference voltage power source for excitation. The signal phase appearing on lead 266 is positive when the vehicle pitches downward for effecting a change of thrust of propulsion units 80 and 82 for an upward pitching movement. Lead 266 is connected to center tap terminal 251 of potentiometer 250. Terminals 253 and 254 are connected to ground whereby the predominant effect of the rate of pitch signal on wiper 252 and lead 255 will be at zero angle of pitch. Likewise, a negative signal will appear on lead 266 when the vehicle is pitching upward and the magnitude of this negative signal on lead 255 will be determined by the degree and rate of tilt about the pitch axis. Lead 255 is connected to amplifier 402 through input resistor 434 and connected to amplifier 403 through input resistor 471 for effecting a change of thrust for propulsion units 80 and 82. Resistors 416 and 450 are calibrated to be mutually the same values so that the same rate of thrust change will occur for propulsion units 83 and 81 for a given magnitude of signal appearing on lead 237. Resistors 415 and 449 are calibrated to be mutually the same value so that the same rate of thrust change will occur for propulsion units 83 and 81 for a given magnitude of signal appearing on lead 232. The proportional difference between the input resistor values associated with lead 232 as compared with those input resistor values associated with lead 237 are determined so that the signal on lead 237 will have predominant effect except at zero angle of roll. Resistors 433 and 470 are calibrated to be mutually the same values so that the same rate of thrust change will occur for propulsion units 80 and 82 for a given magnitude of signal appearing on lead 243. Resistor 434 and 471 are calibrated to be mutually the same values so that the same rate of thrust change will occur for propulsion units 80 and 82 for a given magnitude of signal appearing on lead 255. The proportional difference between the input resistor values associated with lead 243 as compared with those input resistor values associated with lead 255 are determined so that the signal on lead 243 will have predominant effect except at zero angle of pitch. Input resistors 419, 453, 437, and 474 connected by generator feedback leads 420, 454, 432, and 469 determine the rate of integration of signals applied to amplifiers 400, 401, 402, and 403. These feedback resistors are mutually of the same value for sustaining the same rate of integration for any signal common to two or more amplifiers when this signal is applied through a common valued input resistor.

The resultant thrust magnitude of the longitudinal axis propulsion units 80 and 82 is compared with the resultant thrust magnitude of the lateral axis propulsion units 83 and 81 whereby the thrust of each unit will be sustained within a desired range for effective performance of the propulsion units in each axis. The thrust force to overcome gravitational force for sustaining the vehicle in space can be produced principally by either group of propulsion units located along either the longitudinal or lateral axis; and the opposite set of propulsion units may be used principally for stabilization purposes. When the maximum thrust of each vertical propulsion unit is limited in such manner to require equal cooperation of each vertical propulsion unit for overcoming gravitational force, a means for sustaining the thrust of each vertical propulsion unit within a desired range is desirable whereby the thrust required for any vertical propulsion unit or group of propulsion units will not exceed available thrust. Wiper 504, of potentiometer 503, is connected with operating connection 409 and will position in accordance with the thrust magnitude of propulsion unit 83; thus the signal on lead 506 will vary also in accordance with this thrust magnitude. Wiper 509, of potentiometer 507, is connected with operating connection 443 and will position in accordance with the thrust magnitude of propulsion unit 81; thus the signal on lead 510 will vary also in accordance with this thrust magnitude. The signal on lead 510 will depend upon the thrust of both propulsion units 83 and 81 as determined by the connection of lead 506 with potentiometer 507 to obtain this computer multiplication function. Wiper 513 of potentiometer 512 is connected with operating connection 425, and will position in accordance with the thrust magnitude of propulsion unit 80; thus the signal on lead 515 will vary also in accordance with this thrust magnitude. Wiper 517 of potentiometer 516 is connected with operating connection 460 and will position in accordance with the thrust magnitude of propulsion unit 82; thus the signal on lead 518 will vary also in accordance with this thrust magnitude. The signal on lead 518 will depend upon the thrust of both propulsion units 80 and 82 as determined by the connection of lead 515 with potentiometer 516 to obtain this computer multiplication function. Lead 510 is connected with amplifier 475 through input resistor 479 and lead 518 is connected with this same amplifier through input resistor 478 whereby the signals on leads 510 and 518 can subtract from each other. Terminal 502 is connected with the positive phased reference voltage source and terminal 511 is connected with the negative phased reference voltage source. Therefor, the phase on lead 510 will be positive and the phase on lead 518 will be negative. The signal appearing at the junction of input resistors 478 and 479 will depend on the subtraction of the signals on leads 510 and 518. Resistors 478 and 479 are selected to be mutually the same value when the same range of thrust for both groups of vertical propulsion units is desired. Amplifier 475 drives motor 476 by amplifier output connections 477. The output of motor 576 is connected by operating connection 524 to wipers 484, 491, and 496. Potentiometer 483 is a servo answer potentiometer for controlling the limitation of movement of the operating connection 524 determined by the magnitude of the subtracted difference between the signals on leads 510 and 518. Wiper 484 is connected by lead 481 through input resistor 480 to amplifier 475 for applying a signal of the required phase to limit servo response to signals on leads 510 and 518. Potentiometers 488 and 493 provide the required signal magnitude and phase for changing the thrust of propulsion units 80, 81, 82, and 83 depending upon the difference between the thrust range of propulsion units of one axis compared with the second axis. If resistors 478 and 479 are of equal value and if the signal on lead 510 is of greater magnitude than the signal on lead 518, then wiper 491 will servo to a position towards positive phased terminal 487 and then lead 519 will apply this positive phased signal to amplifier 401 through input resistor 452 causing a decrease in thrust of propulsion unit 81. Also the positive phased signal on lead 519 is connected to amplifier 402 through input resistor 436 causing an increased thrust for propulsion unit 80. Also wiper 496 will servo to a position towards negative phased terminal 492 and lead 520 will apply this negative phased signal to amplifier 400 through input resistor 418 causing a decrease in thrust of propulsion unit 83. Also lead 520 will apply this negative phased signal to amplifier 403 through input resistor 473 causing an increase in thrust of propulsion unit 82. The signals on lead 419 and 520 will cause a change of thrust for the vertical propulsion units whereby each group will tend to remain in the same relative thrust range. If it is desirable to operate one group of vertical propulsion units at a relatively larger thrust range than the second group of vertical propulsion units then input resistors 478 and 479 can be made unequal values determined by the unequality of thrust ranges desired. When the currents through resistors 478 and 479 are equal, then both propulsion unit groups are functioning within the required relative thrust range and wipers 491 and 496 are located adjacent to grounded center taps 489 and 494 whereby zero signal occur on leads 419 and 520.

Climb performance for the second arrangement of vertical propulsion units is shown in Figure 8 by leads 363 and 364. Lead 363 is shown in Figure 7 as connected with wiper 357 which has been explained previously as in contact with potentiometer 358 whereby a signal is introduced on lead 363 when the vehicle deviates from a desired rate of climb or descent. A positive phased signal appears on lead 363 when an increased rate of climb is desired. This signal is fed to amplifier 400 and 402 through input resistors 417 and 435, and the thrust of propulsion units 83 and 80 will increase thrust to obtain an increased upward movement. At the same time, lead 364 contains a negative phased signal which is fed to amplifiers 401 and 403 through input resistors 451 and 472 whereby the thrust of propulsion units 81 and 82 will also increase thrust. The signals on leads 363 and 364 reduce to zero when the vehicle assumes the required rate of climb or descent, at which time the thrust of propulsion units 80, 81, 82, and 83 will remain constant until other unbalances occur in the system.

Figure 12 shows a third embodiment of this invention. Three vertical propulsion units 750, 759, and 761 are shown. The direction of discharge is downward whereby suspension can be maintained and vertical movement obtained. The longitudinal axis may be either along frame 753 midway between propulsion units 671 and 759 or parallel to frame 764 and midway between propulsion unit 750 and propulsion units group 759 and 761. The lateral axis is ninety degrees from the longitudinal axis and lies parallel with the plane formed by frames 753 and 764. Propulsion units 750, 759, and 761 are secured to frames 753 and 764 by ring clamps 751, 760 and 763. Combustion agent is distributed to propulsion unit 750 by combustion agent distributing conduits 752 connected with combustion agent controller 706. Combustion agent distributing conduits 754 connect with combustion agent tank 755 and provide a source of combustion agent for controller 706. Controllers 706, 708, and 707 determine the magnitude of combustion agent to be applied to their respective propulsion units 750, 759, and 761 as determined by the tilt about the roll and pitch axes, vertical movement desired, and the relation of each propulsion unit with respect to the vehicle longitudinal and lateral axes. Likewise, combustion agent is distributed to propulsion unit 759 by combustion agent distributing conduits 758 connected with combustion agent controller 708. Combustion agent distributing conduits 757 connect with combustion agent tank 755 and provide a source of combustion agent for controller 708. Also combustion agent is distributed to propulsion unit 761 by combustion agent distributing conduits 762 connected with combustion agent controller 707. Combustion agent distributing conduits 756 connect with combustion agent tank 755 and provide a source of combustion agent for controller 707.

Figure 11 shows the computer system for determining the change of thrust for propulsion units 750, 759, and 761 shown in Figure 12. Servo systems 703, 704, and 705 consist of motor-generators and variable D.C. power output source as explained in detail with reference to Figure 7. Power input leads 712, 713, and 714 connect with the reference voltage power source for exciting the motor-generators of servo systems 703, 704, and 705. The direction and rate of change of D.C. power signal on lead 715 is determined by the phase and magnitude of amplifier output signal on leads 709 as determined by the summation signal appearing at the junction of resistors 722, 723, 724, and 725. Lead 715 connects with combustion agent controller 706 and the magnitude of signal on lead 715 determines the rate of combustion of propulsion unit 750. Likewise, the direction and rate of change of D.C. power signal on lead 716 is determined by the phase and magnitude of amplifier output signal on leads 710 as determined by the summation signal appearing at the junction of resistors 726, 727, 728, 729, 730, and 731. Lead 716 connects with combustion agent controller 707 and the magnitude of signal on lead 716 determines the rate of combustion of propulsion unit 761. Also, the direction and rate of change of D.C. power signal on lead 718 is determined by the phase and magnitude of amplifier output signal on leads 711 as determined by the summation signal appearing at the junction of resistors 732, 733, 734, 735, 736, and 737. The input resistors for operational motor amplifiers 700, 701, and 702 are connected to leads shown in Figure 7 for obtaining pitch, roll, and vertical displacement information. Generator feedback leads 719, 720, and 721, and generator feedback resistors 725, 731, and 737 control the rate of response of their respective servo systems 703, 704, and 705 for a magnitude of signal appearing at the junction of input resistors for each operational amplifier.

Thrust for propulsion units 759 and 761 is determined by the stabilization of the vehicle about both longitudinal and lateral axes, whereas, the thrust for propulsion unit 750 is determined by the stabilization about only one axis. The choice of this axis can be optional. When propulsion unit 750 is used for stabilization about the lateral axis (pitch stabilization), then the input resistors are connected to leads which are not designated in parenthesis in Figure 11. For example, if the longitudinal axis is designated as parallel with frame 753 of Figure 12 and also extending between propulsion units 759 and 761, and the vehicle nose is pointed to the left of the drawing, then the system phasing is set up so that for a positive signal applied to each operational amplifier its respective propulsion unit will respond with the following thrust change:

| Phase | Operational Amplifier | Propulsion Unit | Thrust change |
|---|---|---|---|
| plus | 700 | 750 | increase. |
| plus | 701 | 761 | increase. |
| plus | 702 | 759 | decrease. |

If the vehicle pitches downward the phase on lead 243 will become positive and the thrust of propulsion unit 750 will increase for effecting an upward pitching movement. Lead 243 is connected to amplifier 700 through input resistor 723 for effecting this change of thrust. As explained previously, the signal on lead 243 varies in proportion to the sense and degree of pitch from zero angle of pitch. As the vehicle pitches upward through zero angle of pitch a second signal of negative phase appears on lead 255 in response to pitching rate and displacement from zero angle of pitch. This negative signal reduces the thrust for propulsion unit 750 thereby stabilizing and damping this pitching motion. The thrust of propulsion units 761 and 759 decreases when the thrust of propulsion unit 750 increases in response to the phase and magnitude of signals on leads 249 and 261 which are connected to amplifier 701 through input resistors 728 and 729 and by leads 243 and 255 which are connected to amplifier 702 through input resistors 734 and 735. The phase on leads 249 and 261 are of opposite phase compared with the signals on leads 243 and 255. The resolution of force produced by thrust of propulsion unit 750 will tend to oppose rotation of forces produced by thrust of propulsion unit 759 and 761 and thereby stabilizing the vehicle about the lateral axis. When the vehicle rolls left side down, a positive signal appears on lead 237 through input resistor 727 and the thrust for propulsion unit 761 increases. Also the same signal on lead 237 through input resistor 733 causes a decreased thrust change for propulsion unit 759. The proportional change of magnitude of thrust between propulsion units 759 and 761 will cause the vehicle to rotate about the longitudinal axis towards zero angle of roll. As the vehicle rotates left side upward towards zero angle of roll, a negatitve signal appears on lead 232 in proportion to the rate of roll and vehicle displacement from zero angle of roll. This negative signal on lead 232 tends to decrease the thrust for propulsion unit 761 and increase the thrust for propulsion unit 759 for stabilizing and damping rotation about or through zero angle of roll. Feedback resistors 731 and 737 of amplifiers 701 and 702 are of equal value whereby the same rate of thrust change will occur for a signal common to each amplifier. When the thrusts of propulsion units 759 and 761 are changed for stabilization correction about the roll axis, it is desirable to sustain the same resultant magnitude of forces about the pitch axis. When the rate of change for propulsion units 759 and 761 are equal for a common signal this same resultant magnitude of force about the pitch axis is sustained for stabilization correction about the roll axis.

The signal on leads 363 and 364 are determined by the difference between desired rate of vertical displacement and actual rate of vertical displacement. When the desired rate of vertical rise is greater than actual rate of vertical rise then a positive signal appears on lead 363 which is applied to amplifiers 700 and 701 through input resistors 724 and 730. At the same time, a negative signal appears on lead 364 which is applied to amplifier 702 through input resistor 736. All three propulsion units increase their thrust at the same rate as determined by the mutually common valued feedback resistors 725, 731, and 737. When the vehicle assumes the required rate of vertical rise, zero signal appears on leads 363 and 364 and the vehicle continues to rise at the same rate. The phase of signals on leads 363 and 364 reverse when a change from desired rate of climb to desired rate of descent occurs and vice versa.

Propulsion unit 750 can be used either for stabilization about the roll axis or pitch axis. If propulsion unit 750 is utilized for stabilization about the roll axis the leads shown in parenthesis are used which connect with input resistors 722, 723, 726, 727, 728, and 729. Also phase reversal transformers 738 and 739 are connected to leads 232 and 237 for effecting the required direction of thrust change for propulsion unit 761 in response to the phase appearing on these leads. The heading of the vehicle is towards the upper left hand corner of the drawing in this second method of stabilization with regard to Figure 12. If the vehicle rolls left side downward the phase appearing on lead 237 is positive. Phase reversing transformer 739 reverses the phase of signal on lead 237 and a negative signal is applied through input resistor 727 to amplifier 701 for a decreased thrust for propulsion unit 761 for effecting movement of the vehicle towards zero angle of roll. The signal appearing on lead 232 in reversed in phase by phase reversing transformer 738 thereby providing a signal for damping out movement through or about zero angle of roll with respect to the force produced by propulsion unit 761 depending upon the rate and displacement of such rolling motion. Propulsion unit 761 responds in the same manner to roll stabilizing signals on leads 232 and 237 compared with response of propulsion unit 759. Operational motor amplifier 700 is connected with leads 232 and 237 instead of leads 255 and 243 when this second stabilization method is used. If the vehicle should roll left side down the phase on lead 237 becomes positive and the thrust for propulsion unit 750 increases for the required change of thrust to effect movement of the vehicle towards zero angle of roll. The signal magnitude and phase appearing on lead 232 provides a signal to amplifier 700 for damping out movement through or about zero angle of roll with respect to force produced by propulsion unit 750. Likewise the signals appearing on leads 232 and 237 connect with amplifier 702 through resistors 732 and 733 for controlling the thrust of propulsion unit 759 with respect to movement about the roll axis. Normally, the direction of thrust change for propulsion unit 750 is opposite to the thrust changef or propulsion units 759 and 761 in response to roll signals common to each propulsion unit. Resistors 728 and 729 connect with leads 243 and 255 instead of leads 249 and 261 when propulsion units 759 and 761 are used for pitch stabilization. As the vehicle pitches downward the phase on lead 243 becomes positive and propulsion unit 759 responds for an increased thrust for opposing this downward pitching movement. At the same time, lead 243 also connects with amplifier 702 for causing a decrease of thrust for propulsion unit 761 for effecting a change of resolution of forces about the pitch axis whereby the vehicle tends to return towards zero angle of pitch. The signal on lead 255 is applied to amplifiers 701 and 702 for damping out movement through or about zero angle of pitch with respect to the resultant forces produced by propulsion unit 761 and 759 in response to this signal.

Figure 12 shows the position of propulsion unit 750 as lying on the reference axis of the vehicle which is designated as along frame 753. The location of propulsion unit 750 need not be on the axis which lies parallel to frame 753. This propulsion unit 750 may be displaced from the axis parallel to frame 753 provided that the location is still on the opposite side of the reference axis parallel to frame 754 with respect to location of propulsion units 759 and 761.

A traffic indicating system is shown in Figure 4. Light assemblies 117 and 125 are mounted externally on the vehicle by mounting holes 118, 119, 126, and 127. Light assemblies contain an assorted selection of colored lights for visual transmission of heading of the vehicle. Wipers 113 and 121 rotate in response to vehicle heading as controlled by operating link 110 which is connected with a directional gyro. Commutators 111 and 112 are separated into segments corresponding to compass sections. When wipers 113 and 121 contact a commutator segment one of the leads of cables 114 and 128 are energized and one light in each light assembly is energized. Current sources 120 and 122 connect to wipers 113 and 121 for energizing the lights in light assemblies 117 and 125. Ground leads 115 and 129 provide a return path for current originating from current sources 120 and 122, wipers 113 and 121, segment of commutators 111 and 112, cables 114 and 128, and lights of light assemblies 117 and 125. The selection of light colors for a specific heading is determined by the coding established for this traffic system. This visual traffic control system in combination with operator rate of vertical displacement control provides a novel and inexpensive means for traffic control compatible with normal flight speed, operator's reflexes, and vehicle multiplicity. In combination, this visual traffic control information can be used by the operator by placing switch 375, shown in Figure 7, to contact 378 and climb control can then be manipulated for a change of altitude in response to this visual traffic control system for altitude change versus heading so that collision is avoided. The altitude versus automatic heading system presented in Figure 9 and the visual traffic control system shown in Figure 5 are alternate means for traffic control compatible in a coalescent combination with the novel flight system presented herein.

It is now evident that I have provided a flight system which incorporates novel apparatus for stabilizing a vehicle with respect to the earth's horizontal plane and for providing movement along the earth's horizontal plane. Novel traffic control apparatus has been shown for controlling the vehicle with respect to other vehicles of the same class. The response of the vehicle relative to other vehicles of the same class can be considered to be as important as the response of the vehicle with respect to the earth. A novel power system has also been presented commensurate with a preferred arrangement of element required for an efficient and effective power performance in the flight system described herein.

While there has been described what is at present considered to be the preferred embodiment of the invention, it will be apparent to those skilled in the art that various changes and modifications may be made therein without departing from the spirit or scope of the invention.

What is claimed is:

1. Control equipment for a flight vehicle, comprising a plurality of vertical-thrust generating units distributed about the center of gravity of the vehicle, thrust control means connected to each vertical-thrust generating unit for controlling the amount of the thrust, vehicle stability sensing means responsive to displacement of the vehicle about the roll and pitch axes, the vehicle stability sensing means including an electrical circuit having roll sensing means for producing signals in the circuit the magnitude of which are proportional to the deviation from the roll axis reference angle, and computer means in said circuit responsive to said signals, the computer means being operatively connected to said thrust control means to determine a proportional thrust change of said thrust control means to control the amount of thrust of said vertical-thrust generating units to stabilize the vehicle about said roll axis.

2. The combination and arrangement of elements as recited above in claim 1, but further characterized in that the vehicle stability sensing means includes a gyroscope responsive to displacement of the vehicle about the roll axis, and further characterized in that the roll sensing means includes a potentiometer connected in the electrical circuit, the potentiometer including a wiper, and means operatively connecting the wiper to the gyroscope for displacing the wiper in proportion to the displacement of the vehicle about the roll axis, the potentiometer producing signals in the circuit the magnitudes of which are proportional to a deviation from the roll axis reference angle.

3. Control equipment for a flight vehicle comprising a plurality of vertical-thrust generating units distributed about the center of gravity of the vehicle, thrust control means connected to each vertical-thrust generating unit for controlling the amount of thrust, vehicle stability sensing means responsive to displacement of the vehicle about the roll and pitch axes, the vehicle stability sensing means including an electrical circuit having a first roll sensing means producing a signal in the circuit the magnitude of which is proportional to the deviation from the roll axis reference angle, and including an electrical circuit having a second roll sensing means producing a signal in such circuit the magnitude of which is proportional to the rate of deviation from the roll axis reference angle, computer means in said circuits responsive to said signals, and means operatively interconnecting said computer means and the said thrust control means to determine a thrust change of the said thrust control means proportional to a composite value of said signals as determined by said computer means so as to control the amount of thrust of said vertical-thrust generating units to stabilize the vehicle about the roll axis.

4. The combination and arrangement of elements as recited above in claim 3, but further characterized in that the said second roll sensing means includes a potentiometer having its end terminals grounded, the electrical circuit connecting the potentiometer to the computing means being tapped to the potentiometer at an intermediate point between said end terminals, the potentiometer having a wiper, means operatively connected to said wiper for moving the wiper along the potentiometer in proportion to the rate of deviation from the roll axis reference angle, the potentiometer wiper being located at said intermediate point at the zero angle of roll so that the said signal has predominant effect at the said zero angle of roll.

5. Control equipment for a flight vehicle comprising a plurality of vertical-thrust generating units distributed about the center of gravity of the vehicle, thrust control means conected to each vertical-thrust generating unit for controlling the amount of thrust, a vertical gyroscope responsive to displacement of the vehicle about the roll and pitch axes, an electrical circuit having a roll sensing means operatively connected to said vertical gyroscope producing a signal in the circuit the magnitude of which is proportional to the deviation from the roll axis reference angle, and including an electrical circuit having a second roll sensing means including a potentiometer having its end terminals grounded and having a potentiometer wiper, a generator having its armature connected to the vertical gyro and to the potentiometer wiper, the armature rotating at a speed determined by the rate of roll displacement so that the wiper rotates in proportion to the rate of roll displacement, the generator having its output winding connected to an intermediate point between the said end terminals of the potentiometer, the potentiometer producing a second signal in the electrical circuit the magnitude of which is proportional to the rate of deviation from the roll axis reference angle, computer means in said circuit responsive to said signals, the electrical circuit connecting the potentiometer to the computing means being tapped to the potentiometer at the said intermediate point, the potentiometer wiper being located at said intermediate point at the zero angle of roll so that the said second signal has predominant effect at the zero angle of roll, and means operatively interconnecting said computer means and said thrust control means to determine a thrust change of said thrust control means proportional to a composite value of said signals as determined by said computer means so as to control the amount of thrust of said vertical-thrust generating units to stabilize the vehicle about the roll axis.

6. The combination and arrangement of elements as recited above in claim 3, but further characterized in that the said first roll sensing means includes a potentiometer connected in the electrical circuit, and means operatively connected to the potentiometer for producing the signals in the said circuit the magnitudes of which are proportional to the deviation from the roll axis reference angle.

7. Control equipment for a flight vehicle comprising a plurality of vertical-thrust generating units distributed about the center of gravity of the vehicle, thrust control means connected to each vertical-thrust generating unit for controlling the amount of thrust, vehicle stability sensing means responsive to displacement of the vehicle about the roll and pitch axes, the vehicle stability sensing means including an electrical circuit having pitch sensing means for producing signals in the circuit the magnitudes of which are proportional to the deviation of the pitch axis reference angle, and computer means in said circuit responsive to said signals, the computer means being operatively connected to said thrust control means to determine a proportional thrust change of said thrust control means to control the amount of thrust of said vertical-thrust generating units to stabilize the vehicle about said pitch axis.

8. Control equipment for a flight vehicle comprising a plurality of vertical-thrust generating units distributed about the center of gravity of the vehicle, thrust control means connected to each vertical-thrust generating unit for controlling the amount of thrust, a vertical gyro responsive to displacement of the vehicle about the roll and pitch axes, an electrical circuit having a potentiometer, and means operatively connecting the potentiometer to the vertical gyro for producing signals in the circuit the magnitudes of which are proportional to the deviation from the pitch axis reference angle, and computer means in said circuit responsive to said signals, the computer means being operatively connected to said thrust control means to determine a proportional thrust change of said thrust control means to control the amount of thrust of said vertical-thrust generating units to stabilize the vehicle about the said pitch axis.

9. Control equipment for a flight vehicle comprising a plurality of vertical-thrust generating units distributed about the center of gravity of the vehicle, thrust control means connected to each vertical-thrust generating unit for controlling the amount of thrust, vehicle stability sensing means responsive to displacement of the vehicle about the roll and pitch axes, the vehicle stability sensing means including an electrical circuit having a first pitch sensing means producing signals in the circuit the magnitudes of which are proportional to the deviation from the pitch axis reference angle, and including an electrical circuit having a second pitch sensing means producing a second signal in such circuit the magnitude of which is proportional to the rate of deviation of the pitch axis reference angle, computer means in said circuits responsive to said signals, and means operatively interconnecting said computer means and said thrust control means to determine a thrust change of said thrust control means proportional to a composite value of said signals as determined by said computer means so as to control the amount of thrust of said vertical-thrust generating units to stabilize the vehicle about the pitch axis.

10. The combination and arrangement of elements as recited above in claim 9, but further characterized in that the said second pitch sensing means includes a potentiometer means having end terminals grounded, the electrical circuit connecting the potentiometer means to the computing means being tapped to the potentiometer means at an intermediate point between the said end terminals, the potentiometer having a wiper located at the said intermediate point at the zero angle of pitch so that the signal in such circuit has predominant effect at the zero angle of pitch, and means for actuating the wiper responsive to displacement of the vehicle about the pitch axis.

11. Control equipment for a flight vehicle comprising a plurality of vertical-thrust generating units distributed about the center of gravity of the vehicle, thrust control means connected to each vertical-thrust generating unit for controlling the amount of thrust, a vertical gyroscope responsive to displacement of the vehicle about the roll and pitch axes, an electrical circuit having a pitch sensing means operatively connected to said vertical gyroscope producing a signal in the circuit the magnitude of which is proportional to the deviation from the pitch axis reference angle, and including an electrical circuit having a second pitch sensing means including a potentiometer having its end terminals grounded, a potentiometer wiper, a generator having its armature connected to the vertical gyro and to the potentiometer wiper, the armature rotating at a speed determined by the rate of pitch displacement so that the wiper rotates in proportion to the rate of pitch displacement, the generator having its output winding connected to an intermediate point between the said end terminals of the potentiometer, the potentiometer producing a second signal in the electrical circuit the magnitude of which is proportional to the rate of deviation from the pitch axis reference angle, computer means in said circuit responsive to said signals, the electrical circuit connecting the potentiometer to the computing means being tapped to the potentiometer at the said intermediate point, the potentiometer wiper being located at said intermediate point at the zero angle of pitch so that the said second signal has predominant effect at the zero angle of pitch, and means operatively interconnecting said computer means and said thrust control means to determine a thrust change of said thrust control means proportional to a composite value of said signals as determined by said computer means so as to control the amount of thrust of said vertical-thrust generating units to stabilize the vehicle about the pitch axis.

12. Control equipment for a flight vehicle, comprising a plurality of vertical-thrust generating units distributed about the center of gravity of the vehicle, thrust control means for each vertical-thrust generating unit for controlling the amount of thrust, vehicle stability sensing means responsive to displacements of the vehicle about the roll and pitch axes, said vehicle stability sensing means producing signals the magnitudes of which are proportional to the deviation from the roll and pitch axis reference angle, computer means responsive to said signals for determining a proportional thrust change of said thrust control means to control the amount of thrust of each of said vertical-thrust generating units to stabilize the vehicle about both roll and pitch axes.

13. Control equipment for a flight vehicle comprising a plurality of vertical-thrust generating units distributed about the center of gravity of the vehicle, thrust control means connected to each vertical-thrust generating unit for controlling the amount of thrust, vehicle stability sensing means responsive to displacement of the vehicle about the pitch and roll axes, the vehicle stability sensing means including an electrical circuit having roll sensing means producing signals in the circuit the magnitudes of which are proportional to the deviation from the roll axis reference angle, and including an electrical circuit having pitch sensing means producing signals in a circuit the magnitudes of which are proportional to the deviation from the pitch axis reference angle, and computer means in said circuits responsive to said signals, and means operatively interconnecting said computer means with said thrust control means to determine a proportional thrust change of the thrust control means to control the amount of thrust of said vertical-thrust generating units to stabilize the vehicle about the roll and pitch axes.

14. The combination and arrangement of elements as recited above in claim 13, but further characterized in that said roll sensing means and pitch sensing means each includes a potentiometer in the respective electrical circuits, and means operatively connected to one of said potentiometers for producing signals in the circuit the magnitudes of which are proportional to the deviation from the roll axis reference angle, and means operatively connected to the other potentiometer producing signals in the respective circuit the magnitudes of which are proportional to the deviation from the pitch axis reference angle.

15. Control equipment for a flight vehicle comprising a plurality of vertical-thrust generating units distributed about the center of gravity of the vehicle, thrust control means connected to each vertical-thrust generating unit for controlling the amount of thrust, vehicle stability sensing means responsive to displacement of the vehicle about the pitch and roll axes, the vehicle stability sensing means including an electrical circuit having a first roll sensing means producing signals in the circuit the magnitudes of which are proportional to the deviation from the roll axis reference angle, an electrical circuit having a second roll sensing means producing a second signal in such circuit the magnitude of which is proportional to the rate of deviation from the roll axis reference angle, an electrical circuit having a first pitch sensing means producing signals in the circuit the magnitudes of which are proportional to the deviation from the pitch axis reference angle, and an electrical circuit having a second pitch sensing means producing a second signal in such circuit the magnitude of which is proportional to the rate of deviation from the pitch axis reference angle, computer means in said circuits responsive to said signals, and means operatively interconnecting said computer means with said thrust control means to determine a proportional thrust change of the thrust control means to control the amount of thrust of said vertical-thrust generating units to stabilize the vehicle about the roll and pitch axes.

16. The combination and arrangement of elements as recited above in claim 15, but further characterized in that the said second roll sensing means includes a potentiometer having its end terminals grounded, the electrical circuit connecting the potentiometer to the computing means being tapped to the potentiometer at an intermediate point between said terminals, the potentiometer having a wiper located at said intermediate point at the zero angle of roll so that the said second signal has predominant effect at the zero angle of roll; and further characterized in that the said second pitch sensing means has a potentiometer with its end terminals grounded, the electrical circuit connecting the last said potentiometer to the computing means being tapped to the potentiometer at an intermediate point between said end terminals, the last said potentiometer having a wiper located at the intermediate point at the zero angle of pitch so that the said signal in the electrical circuit has predominant effect at the zero angle of pitch.

17. The combination and arrangement of elements as recited above in claim 16, but further characterized in that the vehicle stability sensing means includes a vertical gyro, a generator having its armature operatively connected to the vertical gyro and to the potentiometer wiper of the roll sensing means, the armature rotating at a speed determined by the rate of roll displacement, and the wiper rotating in proportion to the rate of roll displacement, the generator having its output winding connected to the said intermediate point of the potentiometer of the roll sensing means; and further characterized by a second generator having its armature connected to the vertical gyro and to the potentiometer wiper of the pitch sensing means, the armature rotating at a speed determined by the rate of pitch displacement, the second generator having its output winding connected to the intermediate point of the potentiometer of the pitch sensing means.

18. The combination and arrangement of elements as recited above in claim 15, but further characterized in that the first roll sensing means and first pitch sensing means each includes a potentiometer in the respective electrical circuit, the potentiometers having wipers, and means operatively connected to said wipers for actuating the wiper of the potentiometer of the roll sensing means responsive to displacement of the vehicle about the roll axis to produce a signal in the electrical circuit the magnitude of which is proportional to the deviation from the roll axis reference angle, and for actuating the wiper of the pitch sensing means responsive to displacement of the vehicle about the pitch axis to produce a signal in the electrical circuit the magnitude of which is proportional to the deviation from the pitch axis reference angle.

19. The combination and arrangement of elements as recited above in claim 1, but further characterized by the provision of an electrical circuit including a vertical displacement sensing means producing a signal proportional to the rate of climb, an electrical circuit including vertical displacement selecting means producing a signal proportional to the rate of climb desired, discriminating means in the last said circuits for determining the difference between said vertical displacement sensing means and said vertical displacement selecting means and for producing a signal proportional to such difference, an electrical circuit connecting the discriminating means to said computer means so that said computer means is responsive to the resultant signal from said discriminating means, and means operatively connecting the computer means to the said thrust control means to determine a thrust change of said thrust control means proportional to vertical deviation and roll deviation to control the amount of thrust of said vertical-thrust generating units to stabilize the vehicle about said roll axis and to stabilize the rate of climb.

20. The combination and arrangement of elements as recited above in claim 7, but further characterized by the provision of an electrical circuit including a vertical displacement sensing means producing a signal proportional to the rate of climb, an electrical circuit including vertical displacement selecting means producing a signal proportional to the rate of climb desired, discriminating means in the last said circuits for determining the difference between said vertical displacement sensing means and said vertical displacement selecting means and for producing a signal proportional to such difference, an electrical circuit connecting the discriminating means to said computer means so that said computer means is responsive to the resultant signal from said discriminating means, and means operatively connecting the computer means to the said thrust control means to determine a thrust change of said thrust control means proportional to vertical deviation and pitch deviation to control the amount of thrust of said vertical-thrust generating units to stabilize the vehicle about said pitch axis and to stabilize the rate of climb.

21. The combination and arrangement of elements as recited above in claim 3, but further characterized by the provision of an electrical circuit including a vertical displacement sensing means producing a signal proportional to the rate of climb, an electrical circuit including vertical displacement selecting means producing a signal proportional to the rate of climb desired, discriminating means in the last said circuits for determining the difference between said vertical displacement sensing means and said vertical displacement selecting means and for producing a signal proportional to such difference, an electrical circuit connecting the discriminating means to said computer means so that said computer means is responsive to the resultant signal from said discriminating means, and means operatively connecting the computer means to the said thrust control means to determine a thrust change of said thrust control means proportional to vertical deviation and roll deviation to control the amount of thrust of said vertical-thrust generating units to stabilize the vehicle about said roll axis and to stabilize the rate of climb.

22. The combination and arrangement of elements as recited above in claim 13, but further characterized in that complementary vertical-thrust generating units are disposed on opposite sides of each of the roll and pitch axes, the said computer means being adapted to determine the amount of thrust necessary for each vertical-thrust generating unit, the rate and direction of change of thrust depending upon the magnitude and sense of the signals from the roll sensing means and the pitch sensing means, the means operatively interconnecting the computer means with the thrust control means of vertical-thrust generating units on one side of a reference axis causing a thrust increase in amount for a decreased deviation from zero angle about the reference axis in response to said signals, and the means interconnecting the computer means with the thrust control means of the complementary vertical thrust-generating units on the opposite side of the same reference axis causing a decreased thrust in amount for a decreased deviation from zero angle about the same reference axis in response to said signals, so as to maintain a predetermined condition of vertical displacement.

23. The combination and arrangement of elements as recited above in claim 13, but further characterized by the provision of horizontal thrust means swivel mounted for changing the direction of horizontal thrust, servo means connected to said horizontal thrust means for positioning said horizontal thrust means, an electrical circuit including vertical displacement discriminating means, an electrical circuit including heading sensing means, an electrical circuit including flight control means for determining a required vehicle heading depending upon vehicle altitude within an altitude traffic control range, means interconnecting said computer means with said vertical displacement discriminating means, said heading sensing means and said flight control means for passing signals to said computer means, means interconnecting the computer means with the thrust control means to determine a proportional thrust change of the thrust control means to control the amount of thrust of said vertical-thrust generating units responsive to a function of heading and altitude, and means interconnecting the computer means and servo means to determine the direction of horizontal thrust as a function of heading and vertical displacement.

24. The combination and arrangement of elements as recited above in claim 13, but further characterized in that said computer means are provided with means for selecting the desired rate of change of thrust for said vertical-thrust generating units, and the means interconnecting the said computer means with the thrust control means operating said thrust control means responsive to the predetermined rate of change of the amount of thrust.

25. The combination and arrangement of elements as recited above in claim 13, but further characterized by the provision of an electrical circuit including means for determining the actual altitude, means for selecting a desired altitude, and discriminating means for determining the difference between the actual and desired altitudes and for transmitting a resultant signal, an electrical circuit including means interconnecting the computer means with said discriminating means for applying the resultant signal to said computer means, the means interconnecting the computer means and thrust control means determining a proportional thrust change of the thrust control means to control the amount of thrust of said vertical-thrust generating units responsive to the difference between the actual and desired altitudes.

26. The combination and arrangement of elements as recited above in claim 25, but further characterized by the provision of an electrical circuit including means for selecting an altitude heading range, and selective means for selecting a desired altitude depending upon vehicle heading within said altitude heading range, and an electrical circuit interconnecting said selective means with said computer means for transmitting a responsive signal to said computer means, the means operatively interconnecting the thrust control means with the computer means determining a proportional thrust change of the thrust control means to control the amount of thrust of said vertical-thrust generating units responsive to the desired altitude.

27. The combination and arrangement of elements as recited above in claim 13, but further characterized by the provision of a horizontal-thrust generating unit mounted for swiveling in a horizontal plane, control means connected to the horizontal-thrust generating unit for determining the direction of said horizontal thrust by controlling the swiveling of the horizontal-thrust generating unit, an electrical circuit including heading sensing means for determining vehicle heading, an electrical circuit including heading selecting means for selecting a desired heading, an electrical circuit interconnecting the heading sensing means and heading selecting means for determining the difference between actual and desired vehicle headings and for transmitting a resultant signal, an electrical circuit including means for applying the resultant signal to the control means for determining the direction of thrust of said horizontal-thrust generating unit.

28. The combination and arrangement of elements as recited above in claim 13, but further characterized in that the vertical-thrust generating units are mounted for swiveling about horizontal axes, control means connected to the vertical-thrust generating units for controlling the swivelling, an electrical circuit including lateral speed detection means operatively connected with the swivel control means so as to determine the direction and degree of swiveling of the vertical thrust generating units to reduce lateral movement of the vehicle.

29. The combination and arrangement of elements as recited above in claim 28, but further characterized by the provision of an electrical circuit including an altitude detecting means, an electrical circuit including a control device connected with the lateral air speed detecting means and said altitude detecting means adapted to transmit a signal compensating for density altitude effects of said lateral air speed detecting means, and said control device connected with the said control means for changing the direction of thrust of said vertical-thrust generating units for reducing lateral movement responsive to the compensating signal.

30. The combination and arrangement of elements as recited above in claim 28, but further characterized by the provision of an electrical circuit interconnecting the lateral speed detecting means and said roll sensing means producing a modified signal as the vehicle deviates from the zero angle of roll, and an electrical circuit interconnecting the control device with the said control means for changing the direction of thrust of said vertical-thrust generating units responsive to the modified signal.

31. The combination and arrangement of elements as recited above in claim 13, but further characterized by the provision of an electrical circuit having horizontal acceleration detecting means, and means operatively interconnecting the horizontal acceleration detecting means with said computer means, the means operatively interconnecting the thrust control means with the said computer means determining a proportional thrust change of the thrust control means to control the amount of thrust of said vertical-thrust generating units responsive to proportional changes of horizontal acceleration.

32. The combination and arrangement of elements as recited above in claim 13, but further characterized in that four vertical-thrust generating units are provided, one being located in each of the quadrants defined by the roll and pitch axes.

33. The combination and arrangement of elements as recited above in claim 13, but further characterized in that four vertical-thrust generating units are provided, two being located on the roll axis, one on either side of the center of gravity, and two being located on the pitch axis, one on either side of the center of gravity.

34. The combination and arrangement of elements as recited above in claim 13, but further characterized in that three vertical-thrust generating units are provided, the first and second units being located on one side of a first reference axis and on either side of a second reference axis, and the third such unit being located on the other side of the first reference axis and on the second reference axis, such reference axes being located at right angles and being located in a horizontal plane.

References Cited in the file of this patent

UNITED STATES PATENTS

| | | |
|---|---|---|
| 823,164 | Eble | June 12, 1906 |
| 914,626 | Wood | Mar. 9, 1909 |
| 2,397,659 | Goddard | Apr. 2, 1946 |
| 2,444,318 | Warner | June 29, 1948 |
| 2,450,950 | Goddard | Oct. 12, 1948 |
| 2,463,352 | Broluska | Mar. 1, 1949 |
| 2,537,487 | Stone | Jan. 9, 1951 |
| 2,552,359 | Winslow | May 8, 1951 |
| 2,619,623 | Meredith | Nov. 25, 1952 |
| 2,662,705 | Anderson | Dec. 15, 1953 |
| 2,662,706 | Gille | Dec. 15, 1953 |
| 2,731,215 | Avery | Jan. 17, 1956 |